US007266540B2

(12) United States Patent
Chung et al.

(10) Patent No.: US 7,266,540 B2
(45) Date of Patent: Sep. 4, 2007

(54) MECHANISM FOR DYNAMIC WORKLOAD REBALANCING IN A MULTI-NODAL COMPUTER SYSTEM

(75) Inventors: Lynn Keat Chung, Rochester, MN (US); Christopher Francois, Apple Valley, MN (US); Mark Robert Funk, Mantorville, MN (US); Richard Karl Kirkman, Rochester, MN (US); Henry Joseph May, Mantorville, MN (US); Don Darrell Reed, Mantorville, MN (US); Kenneth Charles Vossen, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 471 days.

(21) Appl. No.: 10/793,470

(22) Filed: Mar. 4, 2004

(65) Prior Publication Data

US 2005/0210469 A1 Sep. 22, 2005

(51) Int. Cl.
*G06F 17/30* (2006.01)
(52) U.S. Cl. ........................ 707/1; 707/104.1
(58) Field of Classification Search .................... 707/8, 707/100, 200; 717/109, 149; 718/105
See application file for complete search history.

(56) References Cited

U.S. PATENT DOCUMENTS

| 5,978,892 | A | 11/1999 | Noel et al. |
|---|---|---|---|
| 5,991,893 | A | 11/1999 | Snider |
| 6,105,053 | A | 8/2000 | Kimmel et al. |
| 6,154,823 | A | 11/2000 | Banayon et al. |
| 6,253,226 | B1 | 6/2001 | Chidambaran et al. |
| 6,353,898 | B1 | 3/2002 | Wipfel et al. |
| 6,658,449 | B1 * | 12/2003 | Brenner et al. ............. 718/105 |
| 2003/0088608 | A1 | 5/2003 | McDonald |
| 2004/0194098 | A1 | 9/2004 | Chung et al. |
| 2004/0221120 | A1 | 11/2004 | Abrashkevich et al. |
| 2004/0230762 | A1 | 11/2004 | Allen et al. |

OTHER PUBLICATIONS

Microsoft Computer Dictionary, 5th Edition, 2002, Microsoft Press, pp. 249-250.

* cited by examiner

*Primary Examiner*—Yicun Wu
(74) *Attorney, Agent, or Firm*—Roy W. Truelson

(57) ABSTRACT

Disclosed is an apparatus, method, and program product for observing the nodal workload balance of the system on an ongoing basis, and for dynamically changing the preferred nodes of existing threads in order to improve nodal balance. Workload balance is ascertained on a nodal basis and then thread-based workload information is collected. If the detected imbalance persists, the thread-based information is used to change the assignment of preferred nodes to threads to improve nodal workload balance.

28 Claims, 39 Drawing Sheets

MECHANISM FOR DYNAMIC WORKLOAD REBALANCING IN A MULTI-NODAL COMPUTER SYSTEM

FIELD OF THE INVENTION

The present invention relates to computer operating systems, and in particular to workload balancing within an operating system.

BACKGROUND OF THE INVENTION

Computer systems are widely used to store and manipulate data. Data is stored in computer system memory and manipulated by computer system programs executing on the computer system's processor. As is well known, a processor is often thought of as the "brains" of the computer system because it is the component within the computer system that executes the computer system's programs, allowing the computer system to do real work. Memory is used to hold computer programs while they are being executed, and to hold data while it is being accessed by the processor executing the computer programs.

To be competitive, the designers of computer systems are continually striving to make computer systems more powerful, while maintaining or reducing computer system size. A common approach is increasing a computer system's overall processing power by increasing the number of processors used. For manufacturing efficiency, processors and memory are often packaged together to form what are called nodes, and computer systems are comprised of one or more such nodes. Within these multi-nodal computer systems, any processor can access memory on any node, but a processor can generally access memory on its own node (a local access) more efficiently than it can access memory on any other node (a remote access).

Computer programs contain a series of instructions that are carried out by the computer system's one or more processors. By carrying out these instructions, processors are said to execute the computer programs. An operating system (the programs that are primarily responsible for operating the computer system for the benefit of other programs) controls the execution of these programs through the use of a job (sometimes called a task or a process). Most processors can only execute one instruction stream at a time, but because they operate so fast, they appear to run many jobs and serve many users simultaneously. The computer operating system gives each job a "turn" at running, and then requires the job to wait while another job gets a turn. In situations where a job needs to wait for something to happen before proceeding (e.g., accessing secondary storage), or where multiple processors are available, a job can create a thread (sometimes called a sub-process or sub-task) to continue or expedite processing asynchronously. A job which has not created any threads can itself be regarded as having a single thread. Thus, jobs can be said to be made up of one or more threads.

From a nodal perspective, the operating system can assign threads to execute in any number of ways. For example, the threads of one job may be selected for execution on a given node while the threads of another job may be selected for execution on a different node. Similarly, threads from the same job may execute on different nodes, and threads that are selected to execute on a given node may be selected to also execute on one or more other nodes before terminating. While this flexibility is beneficial in some respects, it is problematic from a data access perspective. As described above, nodes are comprised of processors and memory, and a processor can access memory on its own node more efficiently than on another node. Thus, in order to execute efficiently, the operating system must assure that each thread accesses its data in memory on the same node on which it is executing.

One way in which operating systems have solved this problem is by associating each thread with a node for which it has a preference both to execute and to access data. Then, when it is time to execute a given thread, the operating system selects a processor on its preferred node whenever possible. Similarly, when data needs to be brought into memory on behalf of the thread, memory on its preferred node is selected whenever possible. This approach is generally helpful in minimizing remote memory accesses, provided that the work done by the executing threads is balanced across the computer system's nodes.

Computer systems with one or more nodes can also be partitioned into two or more logically separate systems. A logical partition may be assigned processors and memory without regard to the node(s) to which they belong. Furthermore, processors and/or memory may be dynamically added to or removed from the partition and/or the computer system due to configuration changes or capacity upgrades or downgrades. The efficiency issues pertaining to local versus remote memory accesses within the computer system also apply within each logical partition. Throughout this description, the term system is used to refer either to an entire non-partitioned computer system, or to a logical partition of a computer system.

While the prior art of associating threads with a preferred node is helpful in minimizing remote memory accesses on an individual thread basis, it does not take into account the long term nodal workload balance across the system. In particular, while the prior art selects the home node for newly created threads based on existing conditions at the time, it cannot predict future workload changes, and must rely on being able to create new threads in the future in order to counteract these ongoing workload changes. If new threads are not being created, or are not being created frequently enough, or if the new threads themselves do not do sufficient work, the prior art cannot sufficiently respond to changes in workload to keep the system balanced from a nodal perspective.

Without a mechanism for observing the nodal workload balance of the system on an ongoing basis and for dynamically changing the preferred nodes of existing threads in order to improve nodal balance, the performance benefits of local memory accesses promised by multi-nodal systems will not be realized. The unavailability of local resources will either lead to delays in services as threads have to wait for their preferred resources, or local memory accesses will be replaced by remote memory accesses as remote resources are used instead.

SUMMARY OF THE INVENTION

The present invention involves an apparatus, method, and program product for observing the nodal workload balance of the system on an ongoing basis, and for dynamically changing the preferred nodes of existing threads in order to improve nodal balance.

In the preferred embodiment, this is accomplished by checking the workload balance on a nodal basis. If an imbalance is detected, the preferred embodiment ascertains system workload on a thread basis. After the thread-based information is collected, the preferred embodiment checks system workload to determine whether the previously detected imbalance persists. If so, the thread-based information is used to change the assignment of preferred nodes to threads to improve nodal workload balance.

BRIEF DESCRIPTION OF THE DRAWINGS

FIGS. 11-14 and 16-25 are flow diagrams showing highlighted steps used in the Watch Dog Handler and Node Balancer of the preferred embodiment to perform Work Redistribution.

DESCRIPTION OF THE PREFERRED EMBODIMENT

Figure 1A:
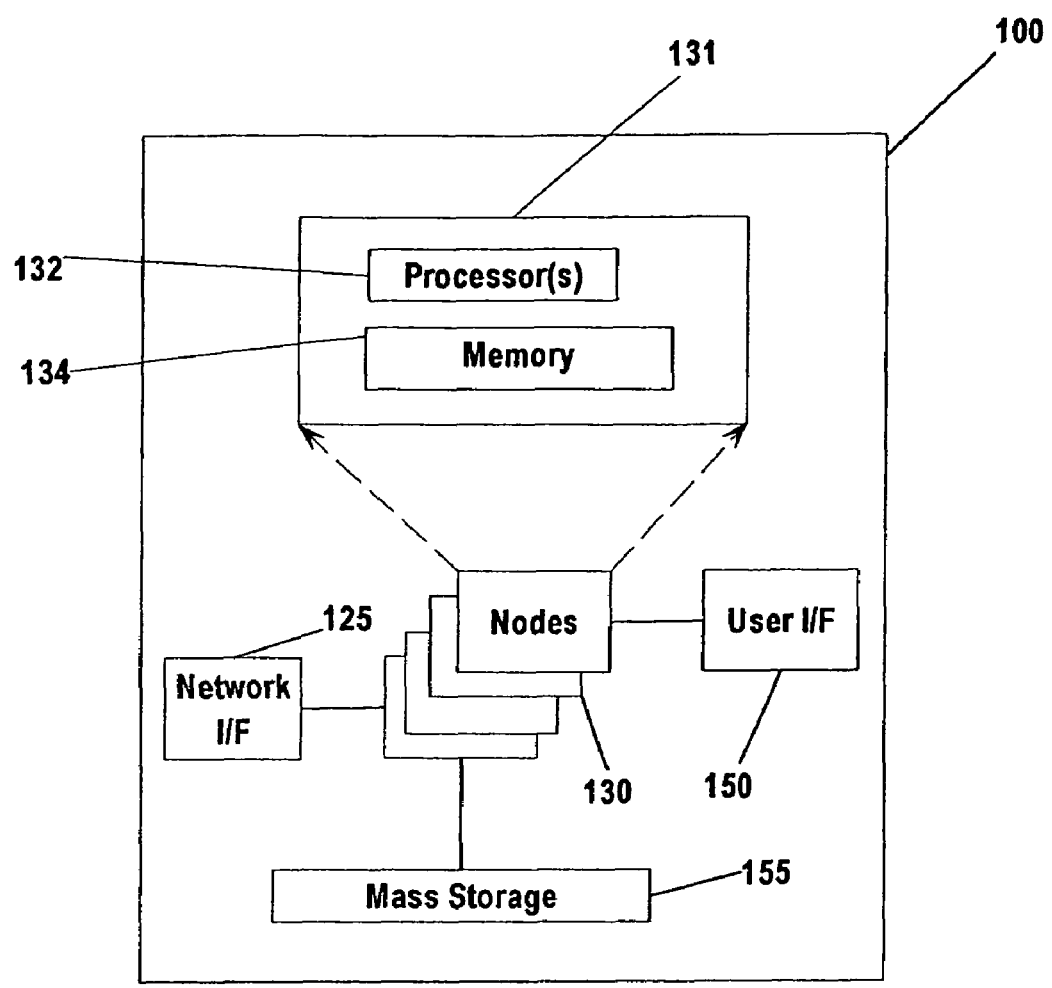
FIG. 1A is a block diagram showing a computing environment that is capable of supporting the preferred embodiment of the present invention.

Turning now to the drawings, FIG. 1A shows some of the operational components used in the computing apparatus of the preferred embodiment of the present invention. Computer apparatus 100 is an enhanced IBM iSeries computer system, although other computers could be used. Depicted components include processing nodes 130, network interface 125, user interface 150, and mass storage 155. Computer apparatus 100 of the preferred embodiment includes four processing nodes, although more or fewer nodes could be used. Network interface 125 is used to communicate with other computer systems. User interface 150 is used to accept commands and relay information to the one or more users of computer system 100.

An exploded view of one of Nodes 130 is also shown (i.e., Node 131). Node 131 contains Processor(s) 132 and Memory 134. In the preferred embodiment, each node can include up to eight Processors 132, although other configurations that include more or fewer processors are possible. Processors 132 are used to execute threads that are stored in memory 134, although it should be understood that at certain times these threads may partially or completely reside in mass storage 155. A processor can access memory on any node, though it can access memory on its own node more efficiently.

Figure 1B:
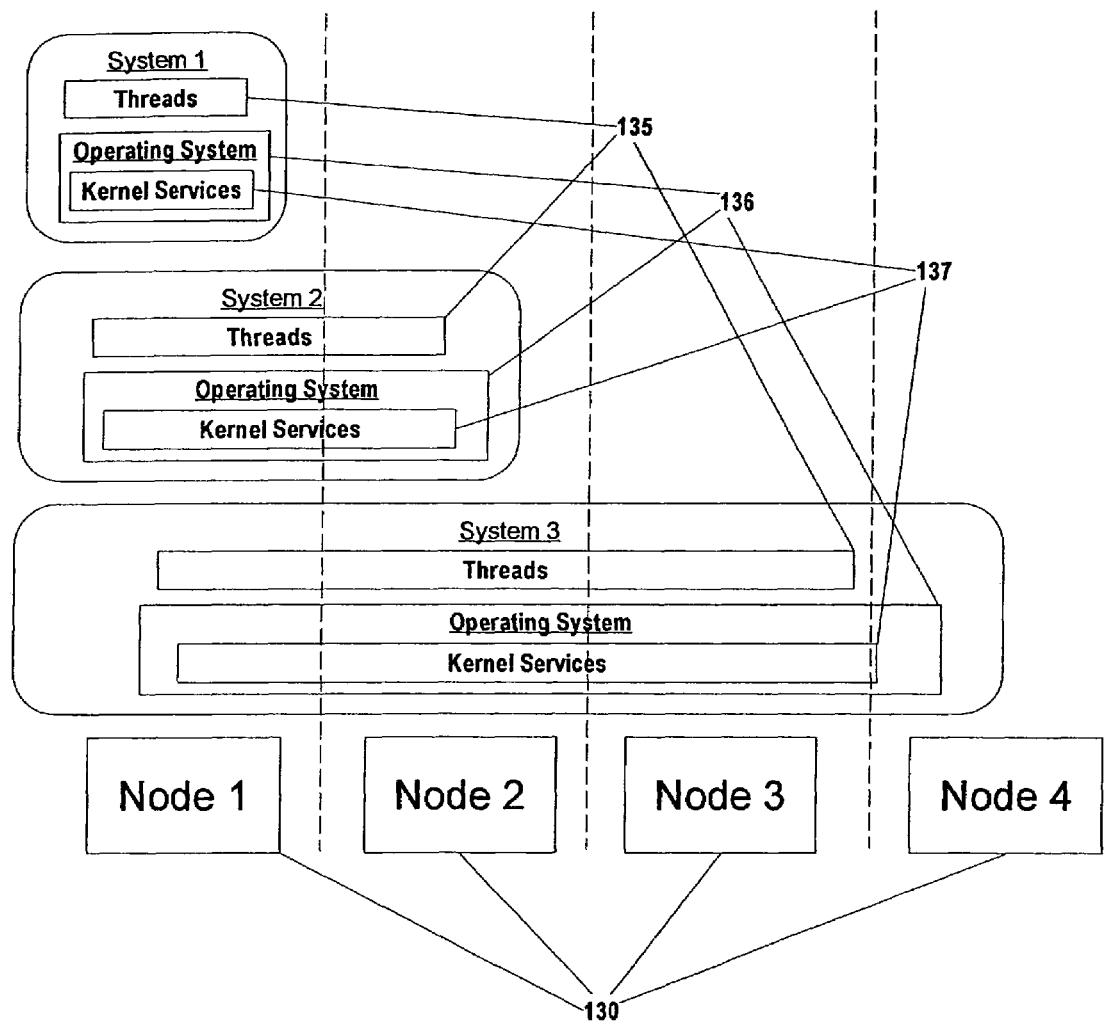
FIG. 1B is a block diagram showing an alternate computing environment that is capable of supporting the preferred embodiment of the present invention.

FIG. 1B shows a more detailed view of the computing environment of the preferred embodiment. As shown, the preferred embodiment is capable of operating on a logically partitioned computer system. In this situation, an instance of Kernel Services 137 is configured to reside in each partition (shown on FIG. 1B as Systems 1-3). The mechanisms of the preferred embodiment view each partition as a complete system. Thus, the term system, when used by itself herein, should be interpreted to refer to either a non-partitioned computer apparatus or to a single, logical partition within a computer apparatus. A system may utilize less than all the nodes of an entire computer apparatus, as is the case with Systems 1 and 2. It is also possible for one node to support more than one system, which is the case for nodes 1 and 2. Many of the mechanisms of the preferred embodiment involve assigning and adjusting how work (threads) is distributed amongst the nodes of a system. Therefore, when the configuration of a system is changed, the mechanisms of the preferred embodiment determine whether work distribution adjustment is needed, and if so, perform those adjustments.

Each system is shown to include Threads 135 and Operating System 136. Integrated into Operating System 136 is Kernel Services 137. Kernel Services provide operating system level services to other operating system entities and to other programs. It should be noted, though, that while the preferred embodiment provides Kernel Service notification of rebalancing needs, the present invention is not limited to kernel or operating system level services, but is instead applicable to all services that are capable of taking advantage of rebalancing notification.

As a final preliminary matter, it should be understood that while the embodiments of the present invention are being described herein in the context of a computer apparatus, certain program mechanisms, such as Kernel Services 137, are capable of being distributed in program product form. Of course, a program product can be distributed using different types of signal bearing media, including, but not limited to: recordable-type media such as floppy disks and CD ROMs; and transmission-type media such as digital and analog communications links.

Figure 2:
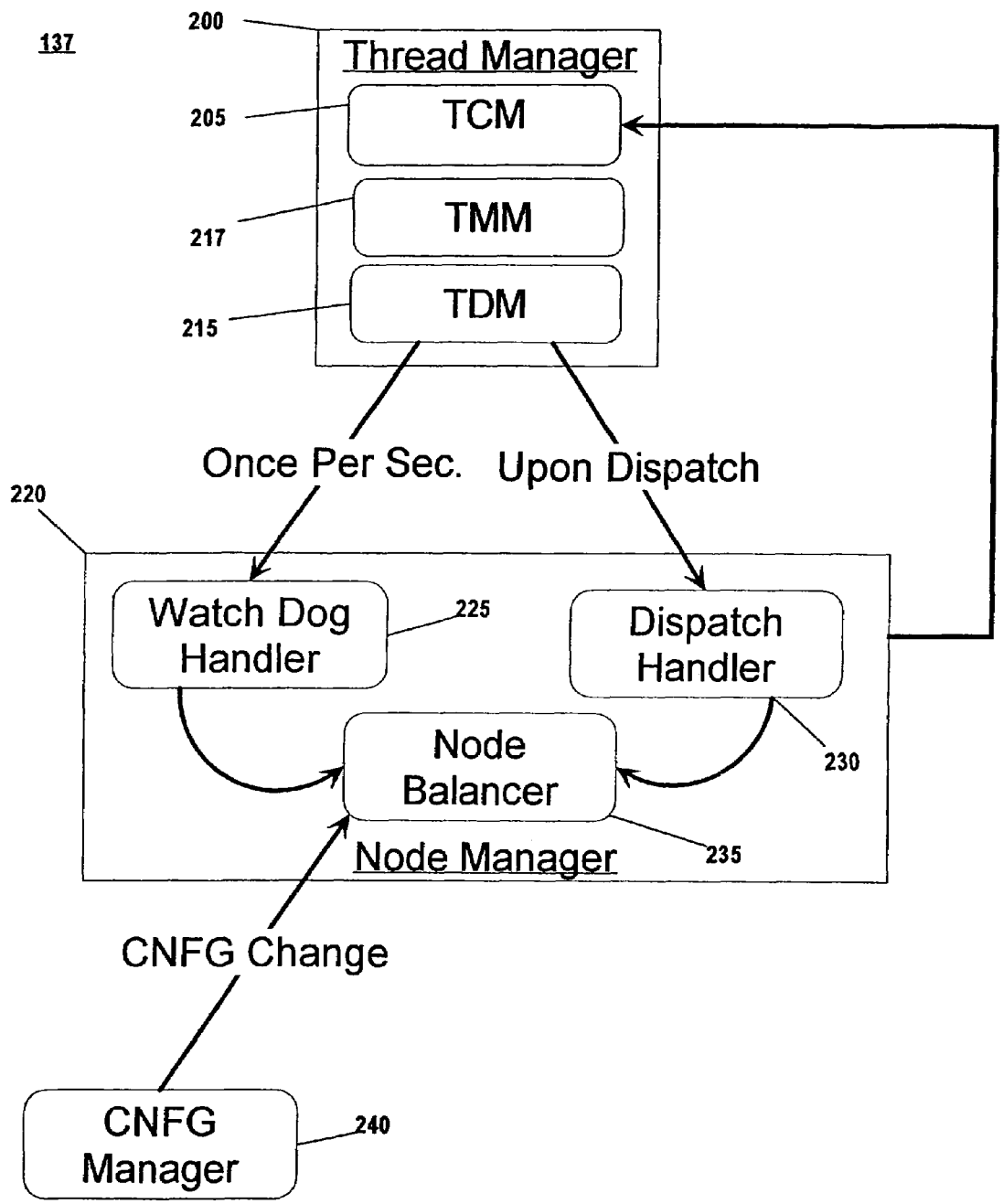
FIG. 2 is a block diagram showing an expanded view of the Kernel Services of the preferred embodiment of the present invention.

FIG. 2 is an exploded view of some of the aspects of Kernel Services 137 of the preferred embodiment. As shown, Kernel Services 137 includes Thread Manager 200, Node Manager 220, and Configuration Manager 240. Thread Manager 200 is further shown to include Thread Creation Mechanism (TCM) 205, Thread Dispatch Mechanism (TDM) 215, and Thread Memory Manager (TMM) 217. TCM 205 is used in the preferred embodiment to create executable threads along with the necessary thread control structures. As part of the creation process a home node is also assigned to these executable threads by TCM 205. Home node assignment is important because TDM 215 is biased to execute threads on their assigned home node when possible and TMM is biased to allocate memory from their Home Node when possible. The implications of this bias pertain to overall system utilization and to resource allocation. The Home Node assignment aspect of TCM 205 is described in the text accompanying FIGS. 26-28.

After threads have been created and assigned to a home node by TCM 205, they are dispatched for execution by TDM 215. Generally speaking, threads can be executed on any one of a number processors on the various nodes of the system. TCM 205 is the entity within the preferred embodiment that is responsible for grouping threads so as to best utilize available processor and memory resources. Additional details as to the function and inner workings of TCM 205 are provided in the forthcoming discussion of FIGS. 3A through 5.

Also shown on FIG. 2 is Node Manager 220. Node Manager 220, which is itself comprised of three discrete entities, is used in the preferred embodiment to determine the relative work load of the various nodes in the system. Node Manager 220 is additionally used in the preferred embodiment to identify and correct workload imbalances within the system and to notify other kernel services of changes to nodal work load so that these services can themselves adjust accordingly. Imbalance identification and handling are described in the Work Redistribution section of this patent (FIGS. 11-14 and 16-25), whereas Kernel Component Balancing Notification is described in the text accompanying FIGS. 7-11, 14, and 15.

Shown within Node Manager 220 are Dispatch Handler 230, WatchDog Handler (WDH) 225, and Node Balancer 235. These three entities operate within the system of the preferred embodiment as asynchronous threads. Those skilled in the art appreciate that the asynchronous nature of these threads implies the need for atomic data accesses. Thus while occasional reference to atomicity issues is made herein, this patent does not contain extensive treatment of underlying atomicity mechanisms, which as mentioned, are well-known to those skilled in the art. As its name suggests, Dispatch Handler 230 is responsible for handling dispatch requests from TDM 215. Since threads are continually being dispatched, Dispatch Handler 230 runs quite frequently. In this context, one of its responsibilities is to accumulate processor execution cycle counts on a home node basis. (The exact means used by Dispatch Handler 230 to acquire this cycle information is not important to an understanding of the preferred embodiment, and thus, it is not described herein.) WDH 225, which is scheduled to execute every second, harvests these accumulated cycles every seven seconds. This seven second interval is referred to herein as the Current Weight Interval. After harvesting the information, WDH 225 performs various calculations on the information that ultimately become Current Weights. (The use of Current Weights within the preferred embodiment is explained in forthcoming paragraphs.) At certain times WDH 225 is also responsible for notifying Node Balancer 235 each time a Current Weight Interval expires. Node Balancer 235 utilizes this notification to determine whether Kernel Component Balancing Notification is required.

Also shown on FIG. 2 is Configuration Manager 240. Configuration Manager 240 is the entity in the preferred embodiment that signals a configuration change to Node Balancer 235. Node Balancer 235 then considers the configuration change and takes appropriate action relative to work distribution and kernel component balancing notification. Examples of configuration changes include increasing or reducing the number of processors or memory on the system.

Grouping Threads Based on Memory Affinity

The present invention provides the advantage of grouping two or more threads into a Memory Affinity Group (MAG) for the purposes of permitting local access to shared data for more than one thread. Performance gains attributable to local memory accesses are thereby achieved by allowing threads with interdependent data access needs to execute on the same node. In the preferred embodiment, threads are placed into MAGs individually or on a job basis. If placed into a MAG on a job basis, all of the threads of a given job are all placed in the same MAG. Those skilled in the art, though, appreciate that alternatives exist. For example, it would be possible to specify MAG participation at both levels with one specification overriding the other.

Figure 3A:
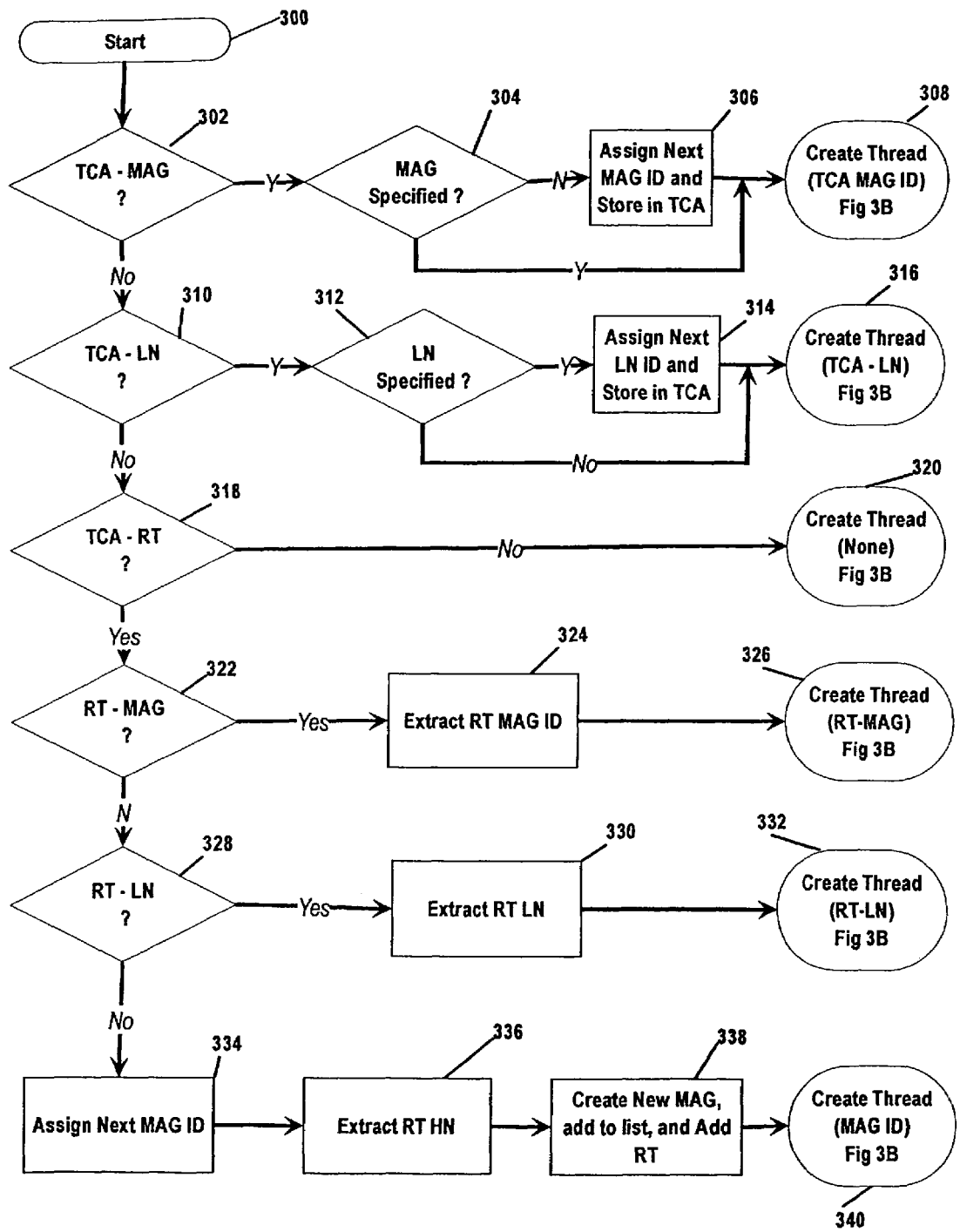
FIGS. 3A and 3B are flow diagrams showing the steps used to carry out highlighted processing of the Thread Creation Mechanism of the preferred embodiment.

FIGS. 3A through 5 are used herein to describe the memory affinity grouping aspects of the present invention. In the preferred embodiment, MAG determination and Logical Node assignment take place at the time an executing thread requests that another thread be created. FIG. 3A is used herein to describe that part of TCM 205 that is responsible for the direct interaction with the requesting thread. The results of this interaction ultimately lead to thread creation, which is described in the text associated with FIG. 3B. Turning first to FIG. 3A, block 300 shows the receipt of a request to create a thread. Next, in block 302, TCM 205 determines whether the thread creation request specifies whether participation in a MAG is desired. In the preferred embodiment, the desire for MAG participation is specified within persistent Thread Creation Attributes (TCA) to which TCM 205 has access. If MAG participation is desired for this thread, TCM 205 next determines whether the TCA specifies a particular MAG [block 304]. In the preferred embodiment this specification is done through the use of a MAG identifier (i.e., Group ID). If a Group ID is specified within the TCA, TCM 205 will honor the request and simply create a thread with the specified Group ID [block 308]. If the TCA does not yet have a Group ID specified, it will be assigned the next available Group ID (and thereafter that is the group that will be used by the TCA) [block 306].

If in block 302 TCM 205 determines that the participation in a MAG is not requested, TCM 205 will next determine whether a use of a "logical node" has been specified in the TCA [block 310]. In the preferred embodiment, a logical node, which is different from a physical node, is used to allow requesting threads to specify that created threads be assigned the same or different Home Nodes. The physical node, which is the thread's actual Home Node, is hidden from the requesting thread. This approach has the advantage of permitting logical node specification for the requester while preserving the flexibility of honoring the requests using physical nodes with different identifiers. Thus, the specification of a logical node has the effect of specifying the Home Node for the thread.

If in block 310 use of a logical node has been specified, TCM 205 determines whether the TCA includes specification of a particular logical node [block 312]. If not, TCM 205 assigns the next available Logical Node ID and stores it in the TCA [block 314]. Ultimately, TCM 205 proceeds to create the thread [block 316] using either the Logical Node ID specified in the TCA or the newly assigned Logical Node ID. Returning now to block 310, if TCM 205 determines from examination of the TCA that use of a logical node is not specified, TCM 205 will determine in block 318 whether the TCA includes identification of a reference thread. A reference thread is one in which memory affinity is desired vis-à-vis the to-be-created thread. In the preferred embodiment specification of a reference thread is accomplished by including a Thread ID in the TCA. If a reference Thread ID has not been specified, TCM 205 creates a thread without a logical node or a MAG ID [block 320]. This will have the effect of permitting TCM 205 to select the home node for the requested thread.

If a reference thread has been specified, TCM 205 will next determine whether the specified reference thread is already associated with a MAG [block 322]. If so, TCM 205 will extract the reference thread's MAG ID [block 324], and proceed to create the thread using the specified MAG ID [block 326]. If in block 322 TCM 205 determines that the reference thread is not already associated with a MAG, TCM 205 determines whether the reference thread has a Logical Node assigned to it. If so, TCM 205 extracts the Logical Node of the reference thread [block 330] and creates the thread using the specified Logical Node [block 332]. If in block 328 TCM 205 determines that a Logical Node has not in fact been assigned to the reference thread, TCM 205 will assign the next available MAG ID [block 334] and extract the Home Node from the reference thread [block 336]. Once this is accomplished, a new MAG is created and added to the MAG list, the reference thread is also added to the MAG [block 338]. TCM 205 then creates the thread using the specified MAG ID [block 340].

Figure 3B:
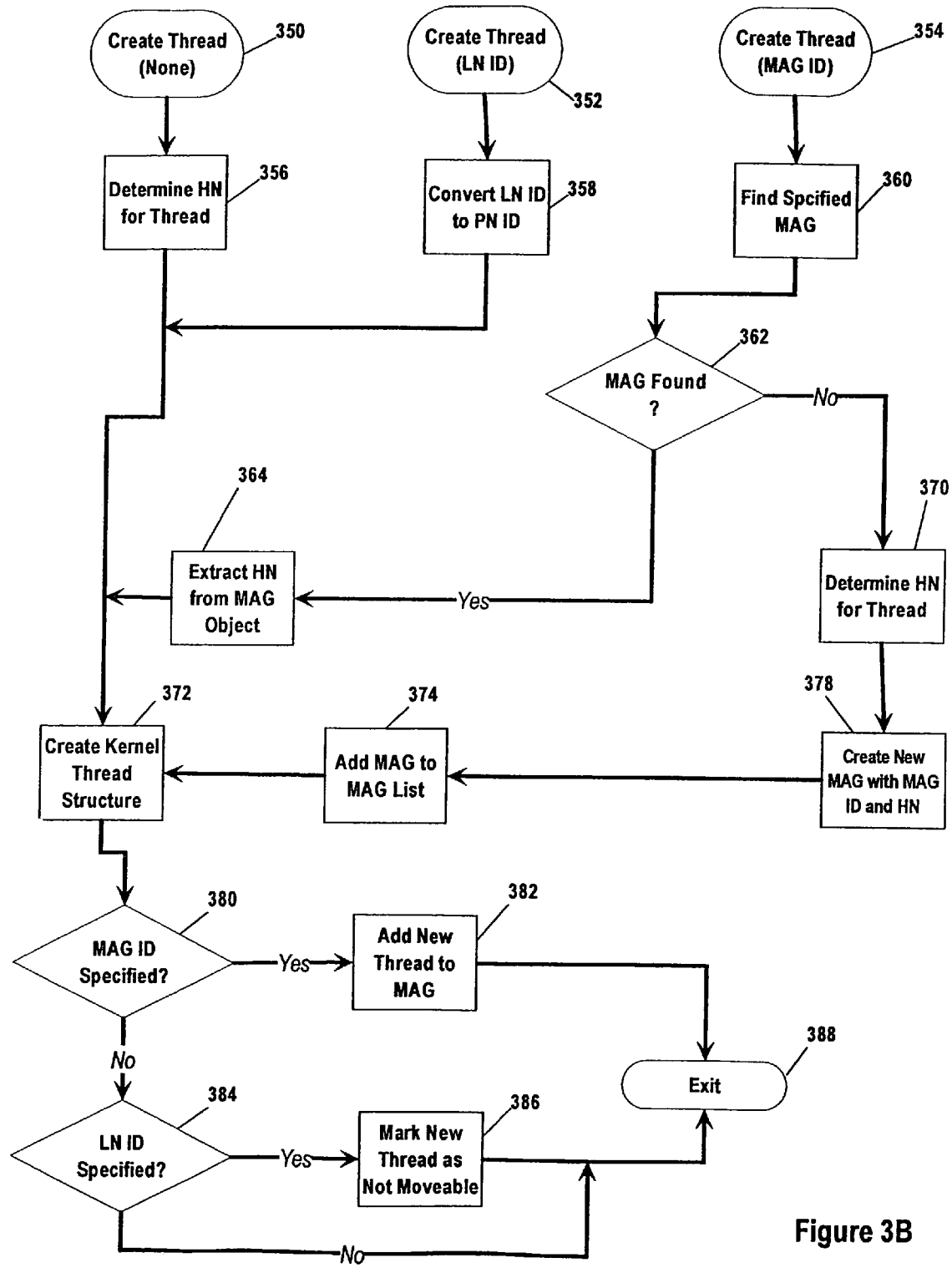

FIG. 3B shows the steps used in TCM 205 of the preferred embodiment to actually carry out thread creation. There are three entry points to the logic of FIG. 3B. A thread can be created with a MAG ID as input [block 354], with a Logical Node ID as input [block 352], or without specification of a MAG ID or Logical Node ID [block 350].

If TCM 205 enters the logic of FIG. 3B through block 350, TCM 205 will proceed to determine the Home Node for the thread [block 356]. As mentioned earlier, a thread's Home Node is the node on which the thread will be dispatched whenever possible and whose memory will be allocated on behalf of the thread where possible. In making the Home Node determination, the system takes several factors into account, including current and desired work load. Specifics as to Home Node determination are provided in the text associated with FIGS. 26-28. TCM 205 then proceeds to create the kernel thread structure for the thread [block 372]. In the preferred embodiment, a kernel thread structure is used to represent a thread. Therefore, creating a kernel thread structure is synonymous with creating a thread. TCM 205 next determines whether the recently created thread is a member of a MAG. The working assumption in this part of the explanation is that the thread creation request did not include specification of a MAG or of a Logical Node ID (see the discussion of block 350 above). Thus, processing of decision blocks 380 and 384 results in a NO, which causes TCM 205 to terminate processing in block 388. At this point the requested thread has been created and assigned to a Home Node.

If TCM 205 enters the logic of FIG. 3B through block 352, TCM 205 proceeds to convert the specified logical node to a physical node, which is then the thread's Home Node. In the preferred embodiment, a deterministic algorithm is used to maintain a consistent correlation between a given logical node and a given physical node, and the mapping can be many-to-one. It should be noted, however, that other mapping approaches could be used. Processing of blocks 372, and 380 is the same as has been described above. In this case, though, a Logical Node ID has been specified, which causes TCM 205 to mark the thread as not moveable [block 386], meaning that its Home Node cannot be changed (See the Work Redistribution section below). This is done to honor the requesting thread's specification of a particular logical node.

If TCM 205 enters the logic of FIG. 3B through block 354, TCM 205 will first attempt to find the MAG associated with the Group ID [block 360]. In the preferred embodiment, each MAG is represented by a group object, and each group object contains the Group ID, the Home Node of the MAG, and a list of member threads. The objects are chained together to form a list of MAGs. TCM 205 determines whether a Group ID match is found by traversing the list of MAGs [block 362]. If a match is found [block 362], TCM 205 extracts the Home Node for the MAG from the group object [block 364] prior to creating the kernel thread structure in block 372.

Returning now to processing block 362, if there is no match found in the list of MAGs, TCM 205 needs to determine a Home Node for the to-be-created thread and MAG. TCM 205 proceeds to determine the Home Node for this thread in block 370. (As mentioned, Home Node determination is explained in more detail in text associated with FIGS. 26-28). Once the Home Node is determined, TCM 205 creates a new MAG (i.e., group object) and stores the Home Node and Group ID in the MAG [block 378] and adds the group object to the list [block 374]. With the new MAG added to the list, the thread is then created (i.e., kernel thread structure) [block 372].

As described above, once the kernel thread structure has been created, TCM 205 determines whether the just-created thread is a MAG member. Here, in this portion of the explanation, the thread is a member of the MAG. Thus, TCM 205 proceeds to add the thread to the MAG in block 382. In the preferred embodiment, this is accomplished by adding the thread to the thread list for the MAG.

Figure 4:
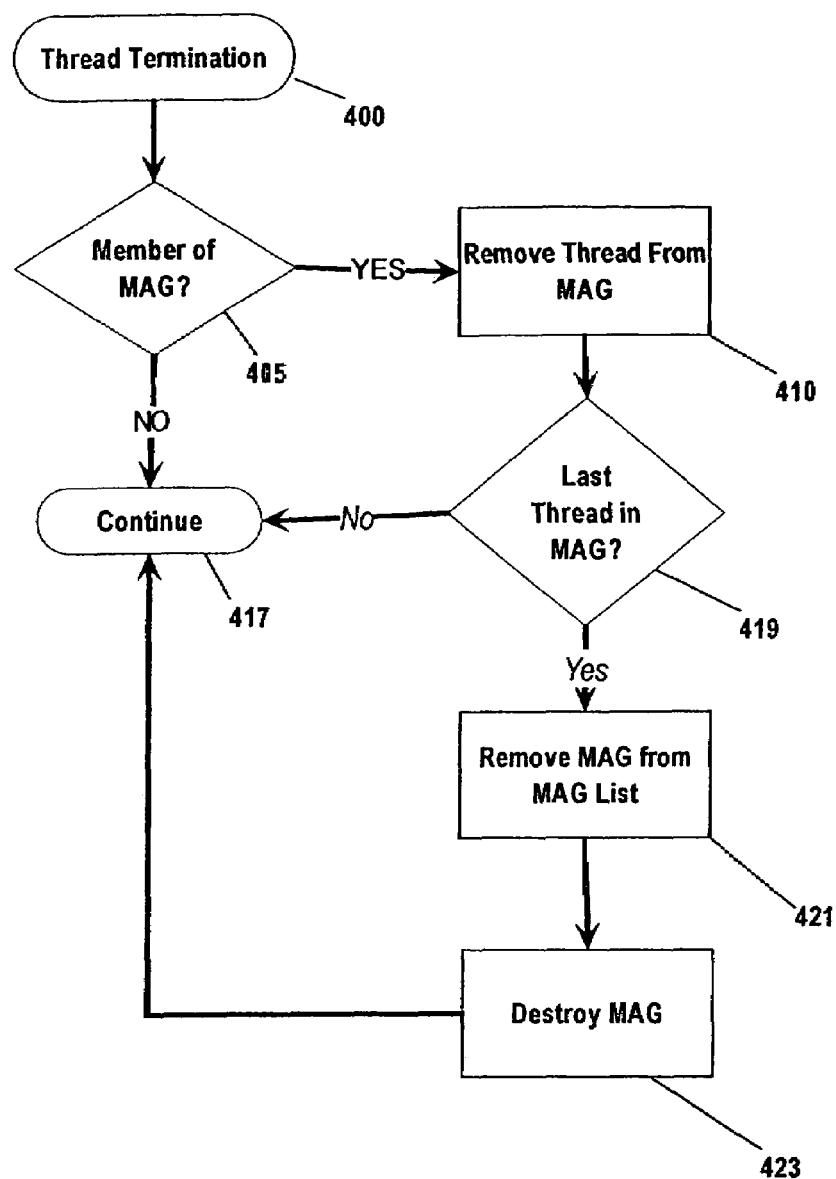
FIG. 4 is a flow diagram showing highlighted steps within the Thread Creation Mechanism of the preferred embodiment to disassociate threads from affinity groups.

FIG. 4 shows highlighted steps used in the preferred embodiment to handle MAG management upon thread termination. When a thread terminates in the preferred embodiment, it has the responsibility to remove itself from a MAG if it is a member of one. Thus, if in block 405 the terminating thread determines that it is not part of a MAG normal thread termination processing simply continues [block 417]. If the thread determines that it is a member of a MAG in block 405, the thread proceeds to remove itself from the MAG's thread list [block 410]. If the terminating thread is not the last thread in the MAG [block 419], termination processing again simply continues. However, the terminating thread is the last thread in the MAG [block 419], the MAG is removed from the MAG list in block 421. The MAG itself is then destroyed in block 423 before normal termination processing continues in block 417.

Figure 5:
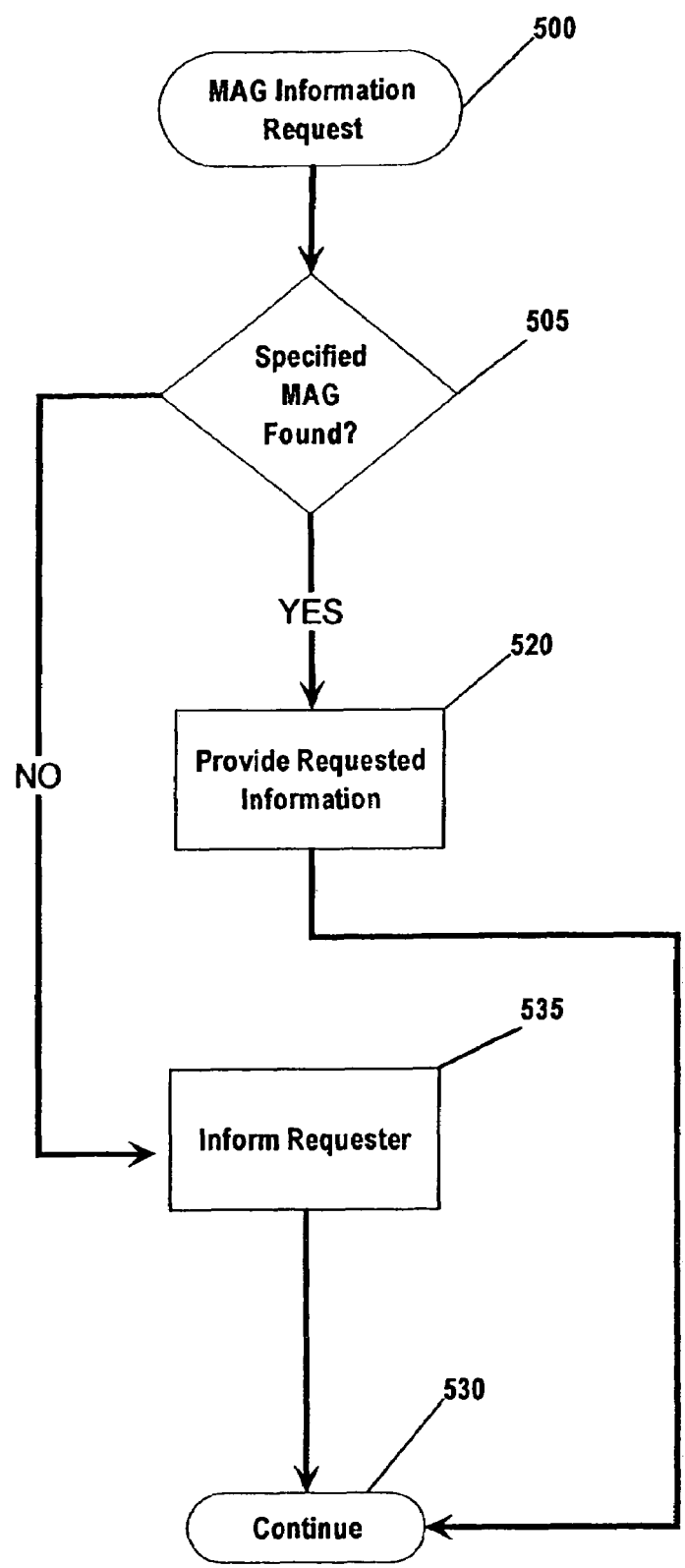
FIG. 5 is a flow diagram showing highlighted steps within the Thread Creation Mechanism of the preferred embodiment to make memory affinity group information available to other system components.

Another aspect of MAG management is surfacing information about MAGs in an environment where MAG existence is fairly transient (i.e., an environment where MAGs come and go). FIG. 5 shows the steps used in the preferred embodiment to accomplish this task. When an information request is received [block 500], an attempt is first made to locate the MAG for which the information is sought [block 505]. If the associated MAG is not found in the MAG list, the requester is notified in block 535, and normal processing then continues in block 530. If the MAG is found, the requested information is then provided in block 520. Processing then continues [block 530].

Kernel Component Balancing Notification

Figure 31:
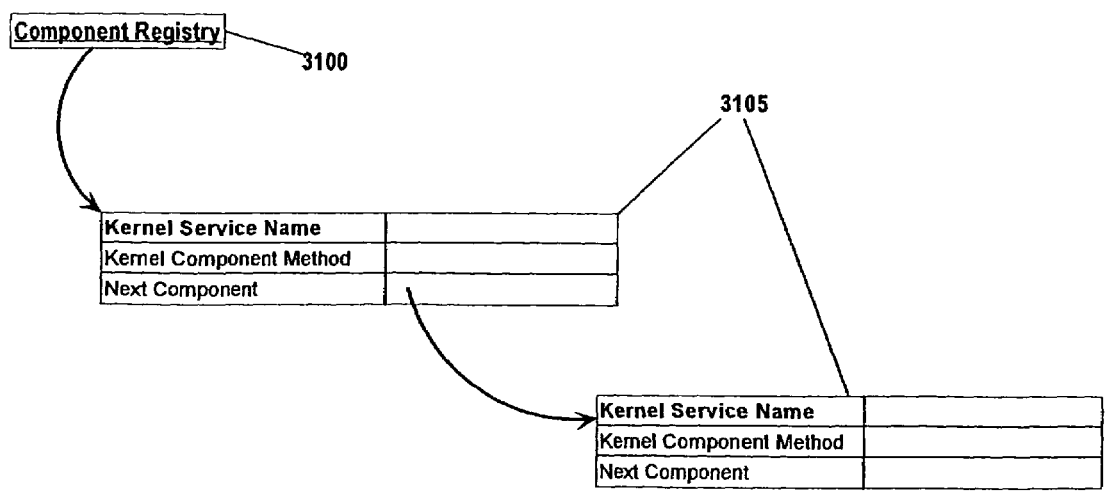

This section of this patent pertains to Kernel Component Balancing Notification. As described above, the mechanisms of the preferred embodiment operate to best balance the overall workload on the system. Associated with this balancing is the need to notify other kernel components (i.e., services) of changes to the distribution of work so that those components can take appropriate steps. To receive notification, a component must register with Node Balancer 235. Node Balancer 235 has access to a Component Registry, which is shown in FIG. 31. The registry used in the preferred embodiment logically appears as a linked-list, with each element containing a Component Name, Component Method, and pointer to the next element in the registry. The Component Method is set up to be called by Node Balancer 235 at the time of notification. It should also be noted that while the preferred embodiment operates in terms of kernel services that number amongst operating system services, application of the present invention is not limited to kernel or operating system services, but is instead applicable to any type of component or service that could benefit from notification of changes to the distribution of work within the system.

System IPL

At the outset, it should be noted that while several preferred embodiment concepts are introduced here in the System IPL section, a full explanation of many of these concepts (i.e., Current Weight, Transition Weight, Weight Differential Threshold, and Initiation Weight) is not provided until the overall context is discussed. The Current Weight, Transition Weight, and Weight Differential concepts are discussed in the text associated with FIGS. 7-9, whereas the Initiation Weight concept is discussed in connection with the discussion of FIGS. 26-28. This approach is taken because better a better understanding can be achieved via the context provided in forthcoming paragraphs.

Figure 6:
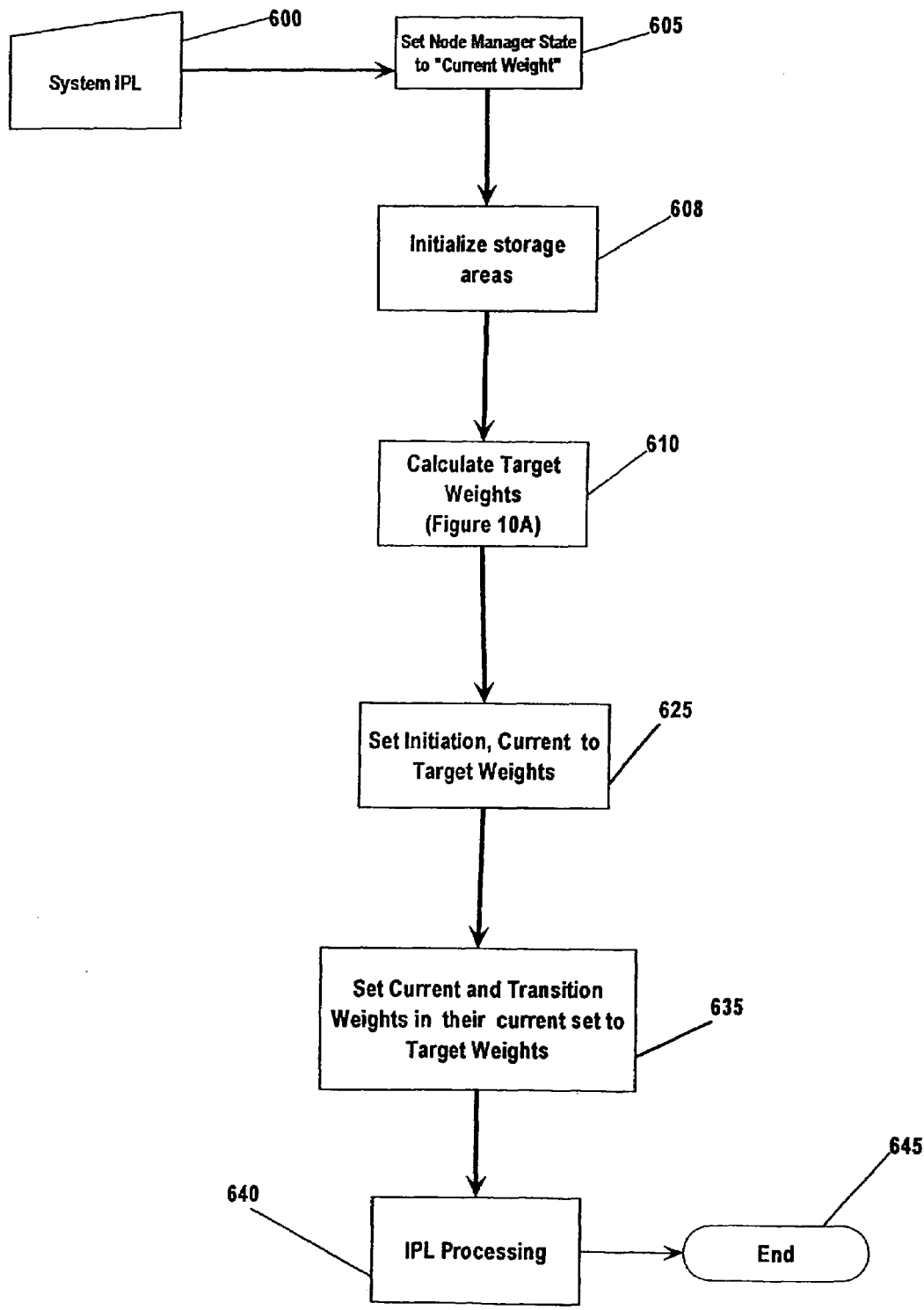
FIG. 6 is a flow diagram showing highlighted steps within the Initial Program Load (IPL) sequence to initialize the various weights used in the preferred embodiment to achieve Kernel Component Balancing Notification (KCBN).
Figure 7:
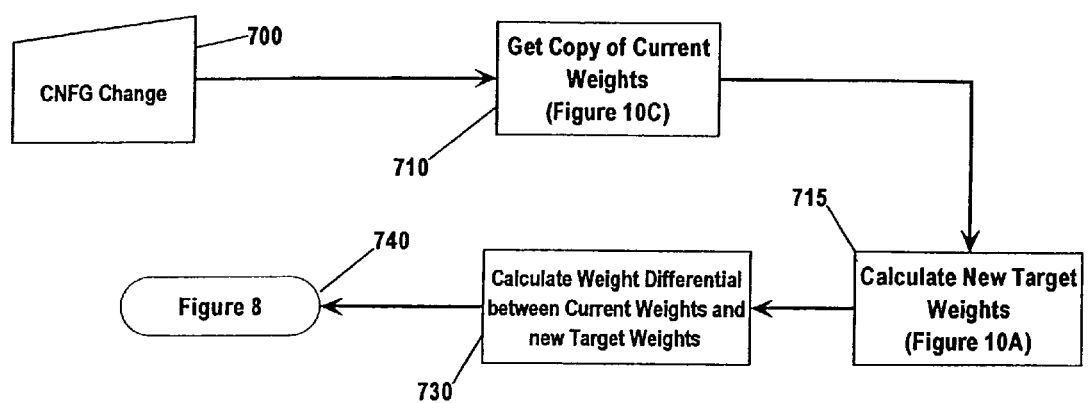
FIGS. 7-11, 14, and 15 are flow diagrams showing highlighted steps used within the preferred embodiment to adjust the various KCBN weights in response to configuration changes within the system.
Figure 10A:
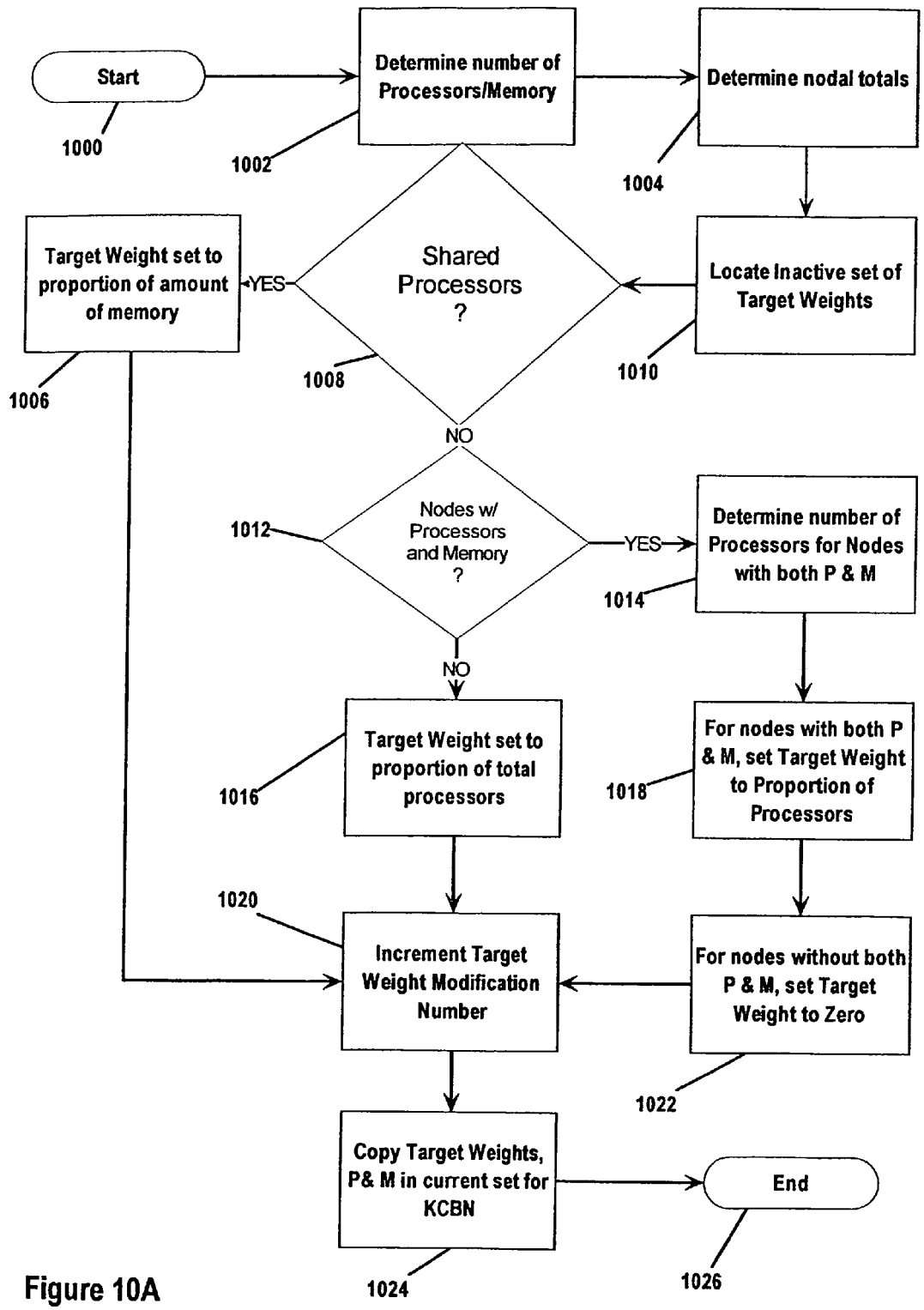

Referring now to FIG. 6, Node Balancer 235 is invoked every time a system is booted, which can occur at any time. Node Balancer 235 sets the Node Manager state (see 2902 of FIG. 29A) to "Current Weight" [block 605] and initializes all of the storage areas to zero (see 2904-3100 of FIGS. 29A-31) [block 608]. Node Balancer 235 proceeds to create a set of weights. These weights, which are created on a home node basis, are used in the preferred embodiment to manage the distribution of work on the system. The first weight that is created is the so called Target Weight. The Target Weight for each node represents the desired share of work for that given node. The objective of the mechanisms of the preferred embodiment is to distribute the work throughout the system in proportion to the various Target Weights. Block 610 of FIG. 6 refers to FIG. 10A, which describes Target Weight calculation. FIG. 10A is explained in detail in the Configuration Change section of this patent.

After returning from the logic of FIG. 10A, Initiation and Current Weights 2930 and 2906 are set to the Target Weights [block 625]. For each node, its Current and Transition Weights are set equal to the Target Weights in the current KCBN set (see 3015 of FIG. 30) [block 635]. The interplay of Transition Weights, Current Weights, and Target Weights is explained in detail in the text associated with FIGS. 7-9. Initiation Weights pertain to Home Node assignment, which is described in the text accompanying FIG. 26-28. All of the above processing must occur before the rest of the IPL processing [block 640], which would include the dispatching of threads and the enablement of Home Node movement by Operating System 136. In addition it can include the nodal distribution of operating system/kernel resources based on Target Weights. IPL processing ends in block 645.

Configuration Change

As will be described in more detail in subsequent paragraphs, Target Weights are driven by the processors and memory available to the system on a nodal basis. Target Weights are established for each system during the bring-up of that particular system. They do not change unless/until a configuration change occurs within the system. The reader is asked to assume here, then, that a configuration change has occurred. This change is represented by block 700 of FIG. 7. The specifics of the change are not important to an explanation of the preferred embodiment, but an example of such a change may be the reconfiguration of a system to utilize two processors of a node instead of three. When Node Balancer 235 receives notification of a configuration change [block 700], Node Balancer 235 proceeds to get a copy of the Current Weights [block 710].

Figure 29A:
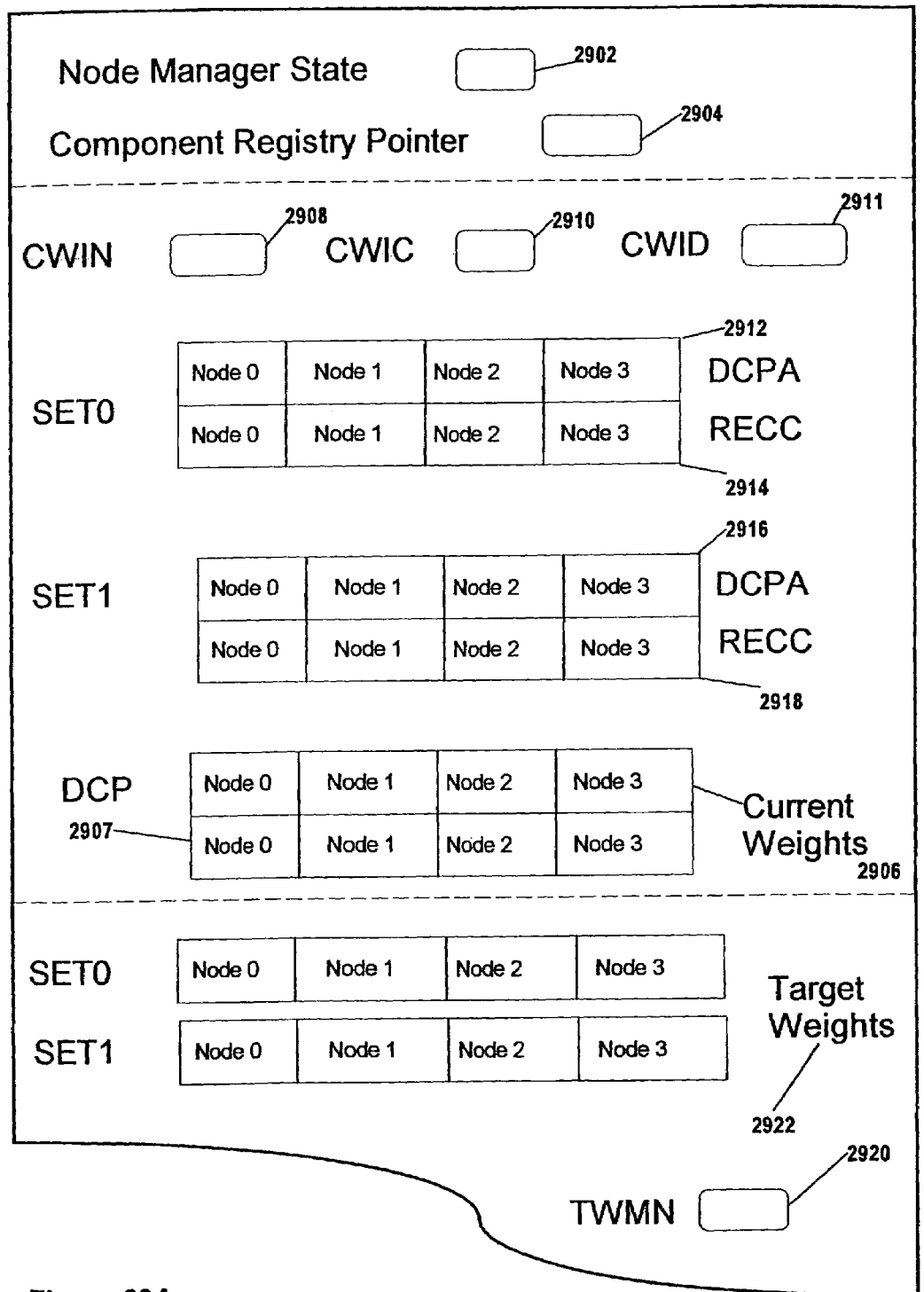
FIGS. 29A through 31 show the data structures used in the preferred embodiment of the present invention.

The Current Weights represent the actual distribution of work within the system. The mechanism used in the preferred embodiment to obtain Current Weights is shown on FIGS. 10C and 10D. The first step taken in FIG. 10C is extraction of the Current Weight Identifier (CWID) [block 1048] followed by the extraction of the Current Weight Interval Number (CWIN) [block 1049]. Current Weights are only valid for one interval, and after that they expire and must be recalculated based on the most recent interval. CWID 2911 contains the interval number for which the Current Weights are valid. If CWID 2911 is equal to CWIN 2908, then the Current Weights are valid; if not, the have expired and must be recalculated. Referring briefly to FIG. 29A, the information pertaining to Current Weight handling is shown. Along with CWID 2911 and CWIN 2908, Current Weight Invocation Count (CWIC) 2910 and SET0 and SET1 are shown. Each set includes Dispatcher Commitment Percentage Accumulators (DCPA) and Recently Executed Cycle Counts (RECC). CWIC 2910 is used to determine when a CWI has expired. The DCPA information pertains to the Work Redistribution and Home Node Assignment aspects of the preferred embodiment, and thus, is described in connection with that discussion. Also shown on FIG. 29A are Current Weights 2906 and DCP 2907. Current Weight 2906 is used in this—the KCBN logic now being described—aspect of the preferred embodiment, while DCP 2907 is used in the Work Redistribution and Home Node Assignment aspects of the preferred embodiment.

Returning now to FIG. 10C, after extracting CWIN 2908 in block 1049, Node Balancer 235 first determines whether CWID 2911 is equal to CWIN 2908. If they are equal, Node Balancer 235 proceeds to block 1061 of FIG. 10D (this processing is described later in subsequent paragraphs). If not they are not equal, Node Balancer 235 then tests CWIN 2908 to determine whether it is odd or even [block 1050]. If odd, the RECC [block 1051] and DCPA [block 1054] are extracted from SET1 (see FIG. 29A), but if CWIN 2908 is even, RECC [block 1052] and DCPA [block 1056] are extracted from SET0. As mentioned, Dispatch Handler 230 runs very frequently and accumulates processor execution cycles on a home node basis as part of its function. These cycle counts and the DCP are then harvested by Watch Dog Handler 225 and stored on a nodal basis in the RECC and the DCPA at the end of every CWI. Watch Dog Handler 225 also increments the CWIN, which flip flops the sets between active and inactive and vice versa (this is described in detail in the discussion of FIGS. 11 and 14). Node Balancer 235 then extracts CWIN 2908 again [block 1058] and determines whether it has changed since the previous extraction [block 1062]. Atomicity is an issue because it is possible for a CWI to have expired while the Current RECC and DCPA are being extracted. Therefore, these steps are necessary to ensure that the RECC and DCPA information are extracted from the active set. If CWIN 2908 has changed, the above-described process repeats (see blocks 1062 and 1063 of FIG. 10D) until Node Balancer 235 determines that CWIN 2908 is unchanged.

Figure 10B:
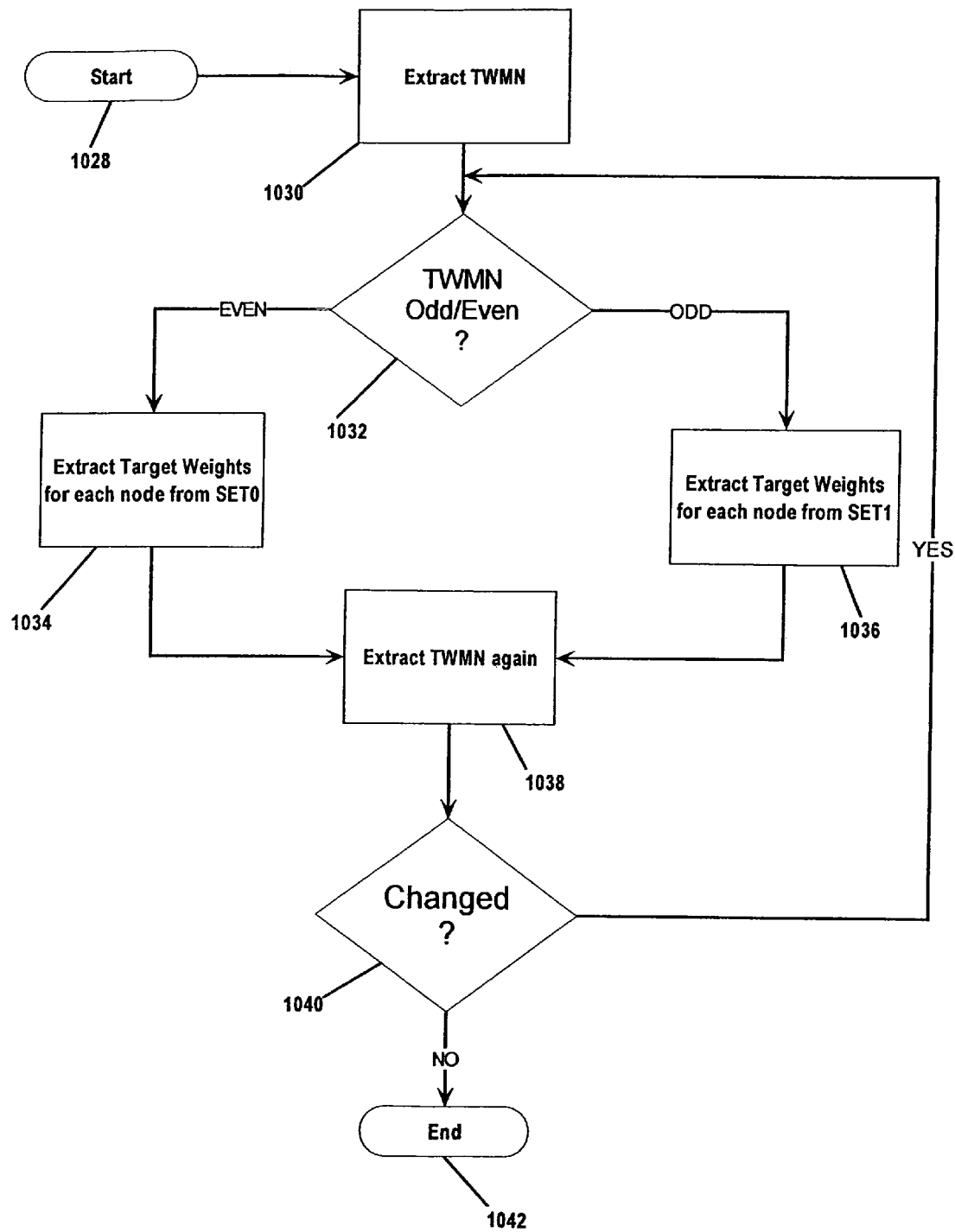
Figure 10C:
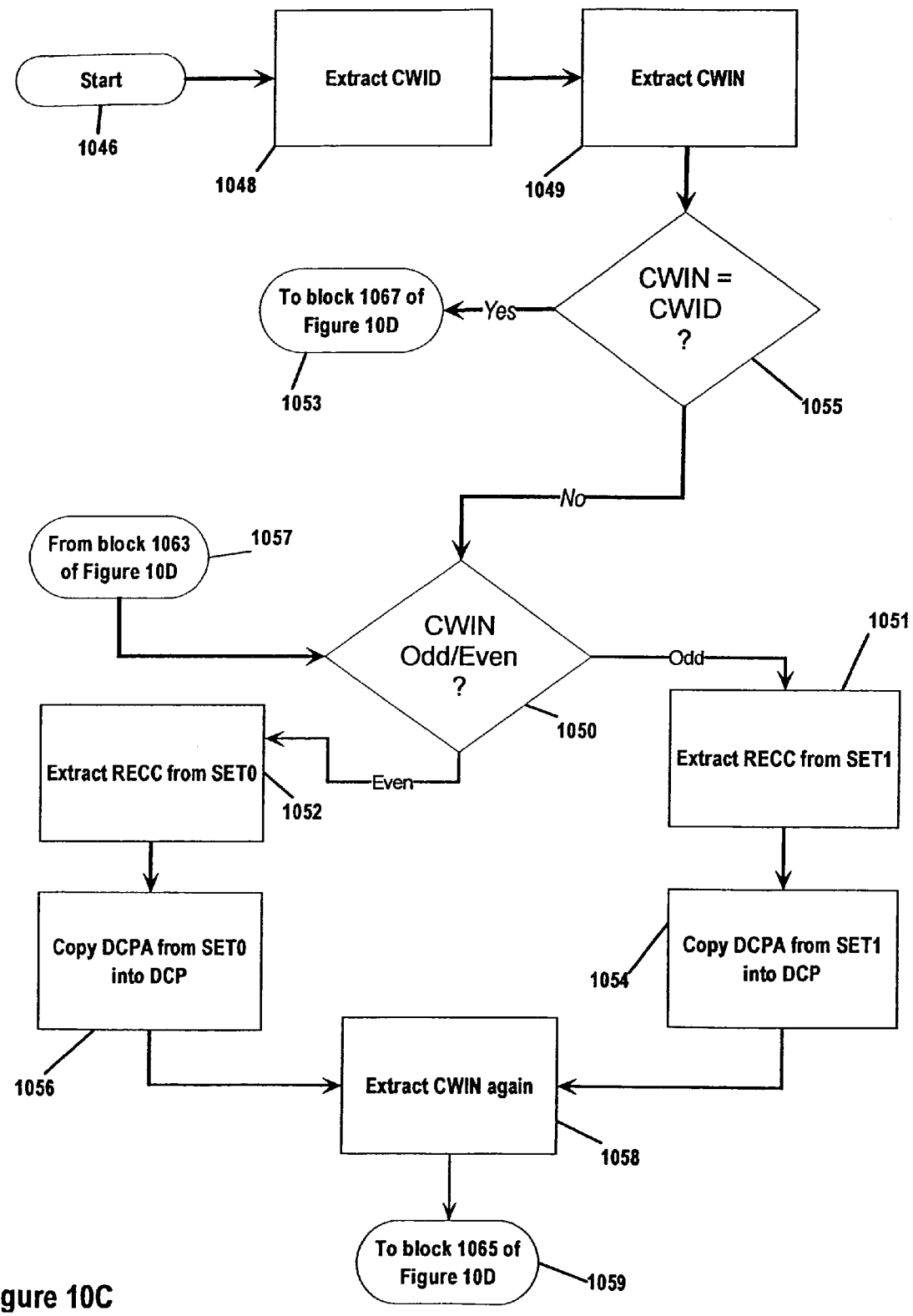
Figure 10D:
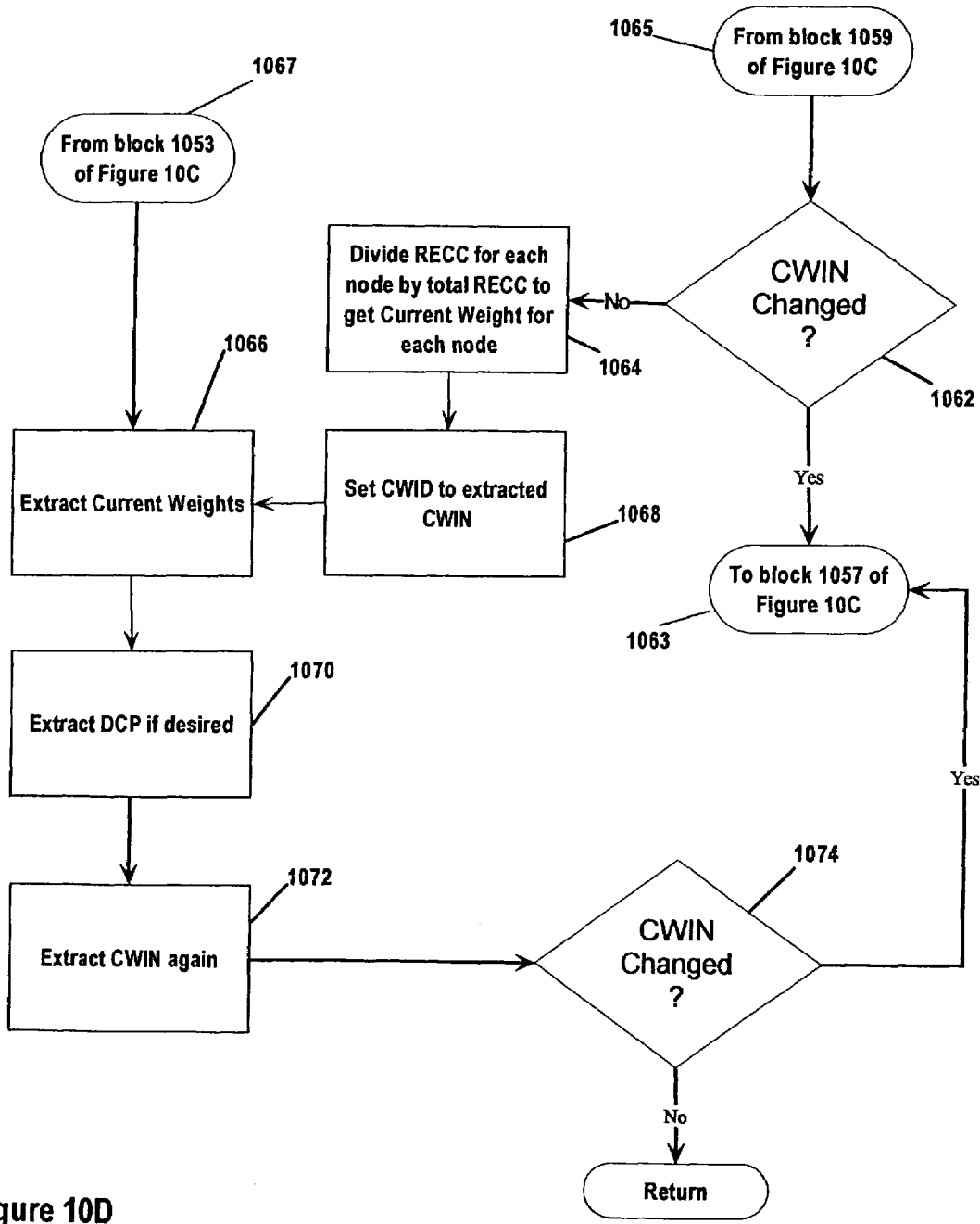

Moving now to FIG. 10D, when Node Balancer 235 determines that CWIN 2908 is unchanged from the previous extraction [block 1062], Node Balancer 235 calculates the Current Weight for each node by dividing the RECC for each node by the total RECC [block 1064]. This yields proportions of current work actually being performed by each node, and thus, they represent the actual share each home node bears of the overall work load. The Current Weights are then stored in Current Weights set 2906 and the DCP is stored in DCP set 2907 of FIG. 29. Once the Current Weights are calculated and stored, CWID 2911 is set equal to the extracted CWIN. The Current Weights are then extracted from Current Weight set 2906 to be returned to the caller of the logic of FIGS. 10C and 10D [block 1066]. The DCP is also extracted from DCP 2907 in block 1070, again for the purposes of returning the DCP to the caller of the logic of FIGS. 10C and 10D. Finally, CWIN 2908 is extracted again in block 1072 and tested against the previously extracted version in block 1074. If the two values are different, processing repeats by continuing in block 1057 of FIG. 10C.

Returning now to FIG. 7, Node Balancer 235 will next determine the new Target Weights [block 715]. The presumption here, of course, is that the Target Weights have changed due to a configuration change. In the first step of FIG. 10A [block 1002], the number of processors and amount of memory within the system are determined for each node. In the preferred embodiment, this information is stored in node-based data structures during system bring up (see 3015 and 3020 of FIG. 30). The reader is asked to recall that the nodes of the preferred embodiment can have zero or more processors. The total number of processors and the total amount of memory across the system are then determined in block 1004. Once the nodal totals are determined, the inactive set of Target Weights will be identified (i.e., SET0 if TWMN 2920 is odd and SET1 if TWMN 2920 is even). The inactive set will be used to calculate a new set of Target Weights (i.e., when they change). Then when TWMN 2920 is incremented, which will have the effect of changing which set is active.

Once the inactive set of Target Weights has been identified, Node Balancer 235 next determines whether the system is configured with dedicated or shared processors. If the system is a non-partitioned computer apparatus, its processors are dedicated by definition since there is no other system (as in FIG. 1A) with which they could possibly be shared. However, a system which is a logical partition may use either shared or dedicated processors. Referring briefly to FIG. 1B, the fact that a node spans multiple partitions does not necessarily mean that the partitions are sharing processors on the node. Processors on a given node may be shared between more than one partition or the partitions may be supported by one or more dedicated processors. A partition with dedicated processors has exclusive use of those processors until such time as it is notified of a configuration change. A partition with shared processors dynamically may be given use of any available processors on the computer apparatus without any such notification. The nature of a system's processors is made available to Node Balancer 235 by Configuration Manager 240. If the system uses shared processors, the Target Weights for each node in the inactive set are made equal to the proportion of memory on that node available to the system to the total amount of memory available to the system across all nodes [block 1006]. TWMN 2920 is then incremented in block 1020, which has the effect of changing the inactive Target Weight set into the active Target Weight set.

If the system does not use shared processors, [block 1008], Node Balancer 235 determines whether the system has any nodes with both processors and memory [block 1012]. A determination of NO (i.e., no nodes with both processors and memory) is not typical, but possible. For example it is possible to configure a partition of Computer System 100 of the preferred embodiment to have nodes with some processors and no memory and other nodes with memory and no processors. If this is indeed the case, Node Balancer 235 sets the Target Weights for each node in the inactive Target Weight set equal to the proportion of processors on that node to the total number of processors available to the system across all nodes, such that nodes without processors will have zero as their Target Weight [block 1016]. TWMN 2920 is then incremented in block 1020, which (again) has the effect of changing the inactive Target Weight set into the active Target Weight set [block 1020].

If in block 1012, Node Balancer 235 determines that at least one node has at least one processor combined with some memory, Node Balancer 235 will next determine the overall number of processors residing on nodes that have at least one processor and some memory [block 1014]. The inactive set of Target Weights is then updated such that the Target Weights for nodes with at least one processor and some memory are set to their respective proportion of processors to the aforementioned overall number of processors [block 1018]. The Target Weights within the inactive set for nodes without either processors or memory are set to zero [block 1022]. TWMN 2920 is then incremented in block 1020, which (again) has the effect of changing the inactive Target Weight set into the active Target Weight set [block 1020].

Figure 30:
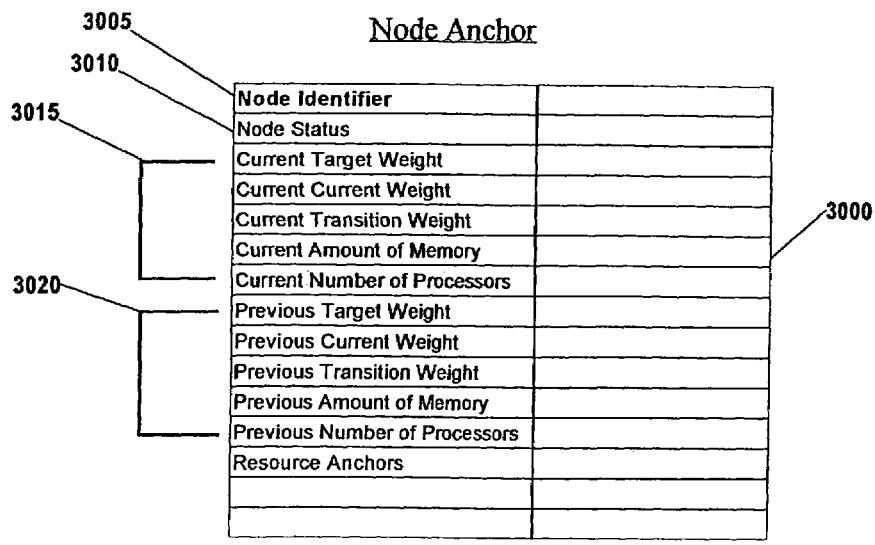

Regardless of the path taken through the flow diagram of FIG. 10A, Node Balancer 235 will ultimately copy the Target Weights, number of processors, and amount of memory into the Node Anchor structure for each node [block 1024]. As will be explained in subsequent paragraphs, this is done to enable a meaningful Kernel Component Balancing Notification. FIG. 30 shows the Node Anchor structures used in the preferred embodiment. Each Node Anchor structure includes an identifier [3005], current weights, processors, and memory [3015], and previous weights, processors, and memory [3020]. Also shown in Node Anchor structure 3000 are a series of resource anchors. These anchors are used by registered components to house resources or pointers to resources that are allocated by the registered components on a nodal basis based on the distribution of work throughout the system. This latter concept will be explained in more detail in subsequent paragraphs.

Figure 29B:
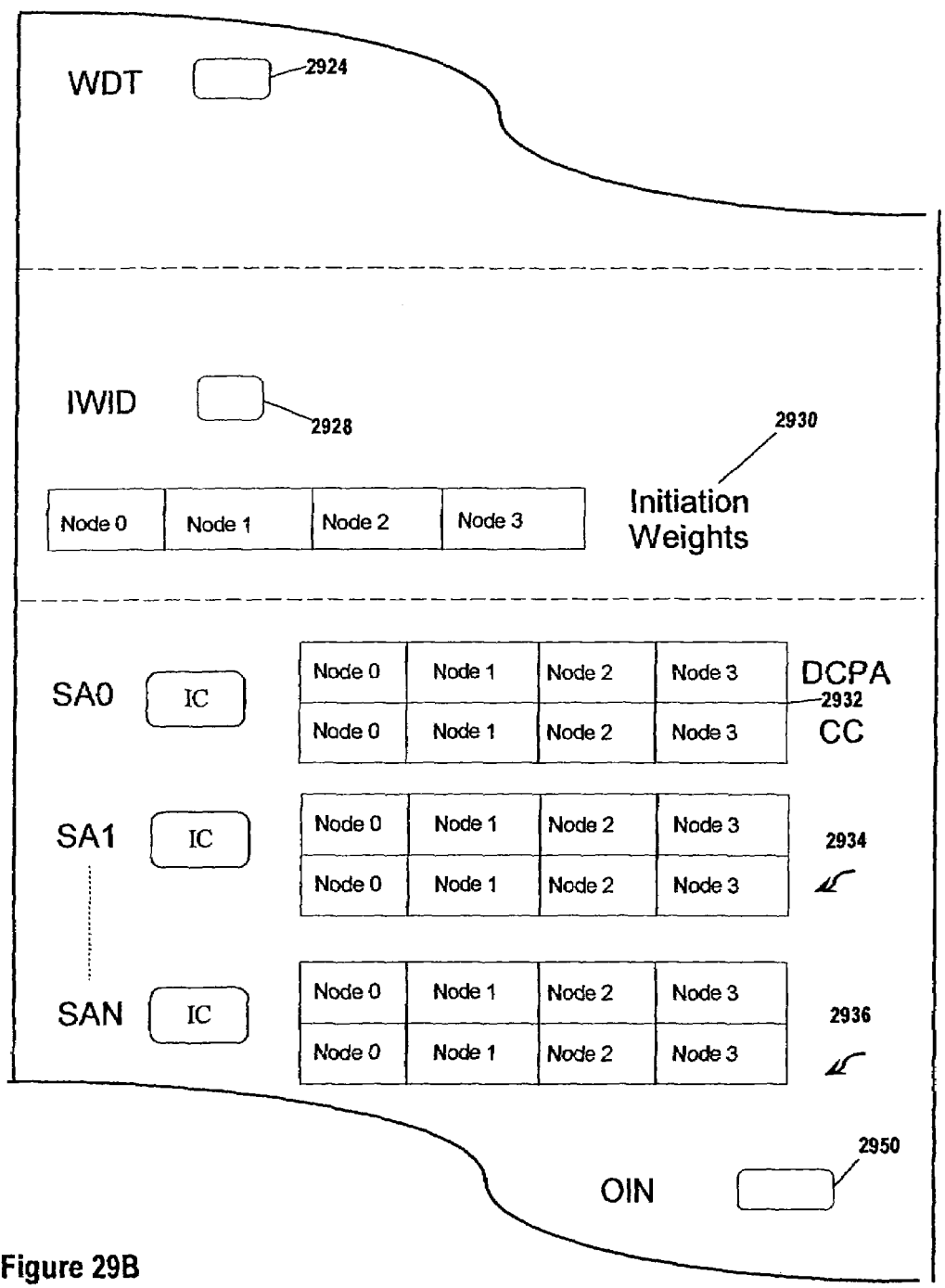

Returning now to FIG. 7, Node Balancer 235 then calculates the weight differential between the Current Weights and the Target Weights [block 730]. The differential is the sum of the absolute value of the difference for each node. Node Balancer 235 processing continues in block 800 of FIG. 8. The Weight Differential Threshold (WDT) is set to ¾ of the just calculated differential. FIG. 29B shows WDT 2924. The WDT is in place in recognition of the fact that actual work distribution may be considerably different than the new desired work distribution. While the system will act to adjust the current work distribution (as represented by the Current Weights) to approach the Target Weights, it may take a fair bit of time to do so. Therefore, it may be inappropriate for registered Kernel Components to simply readjust their resources according to the new Target Weights. Thus, the WDT is used in connection with the so called Transition Weights to provide registered components with the opportunity to more gradually adjust their resources. As will be discussed, Transition Weights are set between Current Weights and Target Weights to provide an intermediate balancing point for registered components. The WDT is used in the preferred embodiment to determine when the difference between Current and Target Weights is sufficiently large to warrant the use of Transition Weights. As will be seen in the ensuing discussion the WDT of the preferred embodiment can be as large as ¾ of the weight differential to as little as the value 1/64 (0.015625).

After setting WDT 2924 to ¾ of the differential, Node Balancer 235 determines whether the differential is less than 1/32 [block 805]. If not, Node Balancer 235 subtracts 1/32 from the differential and determines whether the result is less than WDT 2924. If the result is less than WDT 2924, WDT 2924 is reset to be 1/32 less than the differential. Regardless of the outcome of the test in block 805, Node Balancer 235 ultimately determines whether WDT 2924 is 1/64 or less [block 820]. If WDT 2924 is 1/64 or less, the use of transition weights is not warranted, so WDT 2924 is set to zero and the KCBN Transition Weights in the current set (3015) are made equal to the Target Weights. If Node Balancer 235 determines that WDT 2924 is greater than or equal to 1/64 in block 820, Node Balancer 235 sets the current set of the KCBN Transition Weights (3015) to a value in between the Current Weights and the Target Weights. In the preferred embodiment, this is done according to the following formula.

transition=target+(current−target)*$WDT$/weight differential

Figure 9:
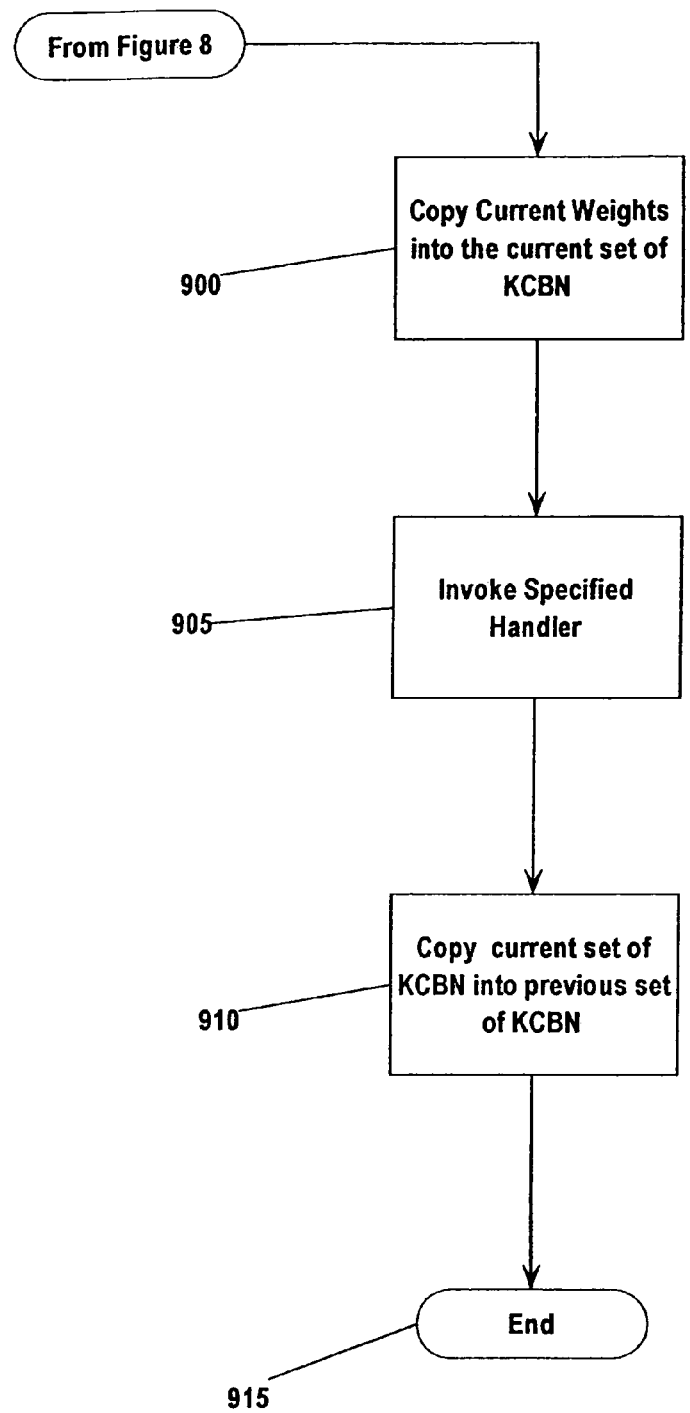

The processing of Node Balancer 235 then proceeds with block 900 of FIG. 9. There the current set of the KCBN Current Weights (3015) are set to the Current Weights. The Kernel Component Method (see FIG. 31) specified for each registered component (3105) is then invoked [block 905].

After being invoked (see block 905 of FIG. 9) the Kernel Component Method has access to the KCBN information stored on each node. The Current, Transition, and Target Weights along with a copy of the previous values of those weights are available to the invoked method. The current and previous number of processors and amount of memory are also available to the invoked method. All of this information is in place to permit the invoked method to determine how to best utilize its resources. An example of a Kernel Component that can make use of the above described notification service is an integrated file system (IFS). File systems will typically utilize sets of pre-created threads to handle different functions. For example, an IFS may have a set of threads that perform hard disk drive (HDD) reads and another set of threads that perform HDD writes. To best utilize these threads, the IFS would use the preferred embodiment to best distribute the threads in a manner consistent with work distribution. If upon invocation, the Kernel Component method associated with the IFS determined through consideration of the KCBN weights that work was being moved from a first node to a second, the method would destroy some or all of its pre-created threads on the first node and create some on the second. Processing then ends for the Configuration Change aspect of Kernel Component Balancing Notification after the current set of KCBN information has been copied into the previous set of KCBN information.

Transition Weight Recalculation

The previous section of this patent pertained to how Transition Weights are calculated and set in the preferred embodiment when a configuration change occurs. With that described, this section of the patent pertains to how the Transition Weights are periodically recalculated to provide for gradual rebalancing through periodic notification. FIGS. 11-14 show steps used in the Watch Dog Handler 225 of the preferred embodiment. As mentioned above, Watch Dog Handler 225 of the preferred embodiment executes once per second and it has function that pertains to various aspects of the preferred embodiment. Only certain of these aspects, however, are interesting for the purposes of this particular discussion (i.e., Transition Weight Recalculation). Thus, only certain figures and processing blocks are explored while others are skipped in favor of treatment in subsequent paragraphs. On FIG. 11, processing blocks 1105-1114 pertain to other aspects of the preferred embodiment. In block 1116 of FIG. 11, Watch Dog Handler 225 increments the Current Weight Invocation Count (CWIC), and since Watch Dog Handler 225 executes every second, the CWIC is incremented every second. (CWIC 2910 is shown on FIG. 29A.) Watch Dog Handler 225 next determines whether the maximum invocation count has been reached for the interval [block 1120]. In the preferred embodiment, the maximum invocation count is seven. A count of seven signals the end of a Current Weight interval.

Figure 14:
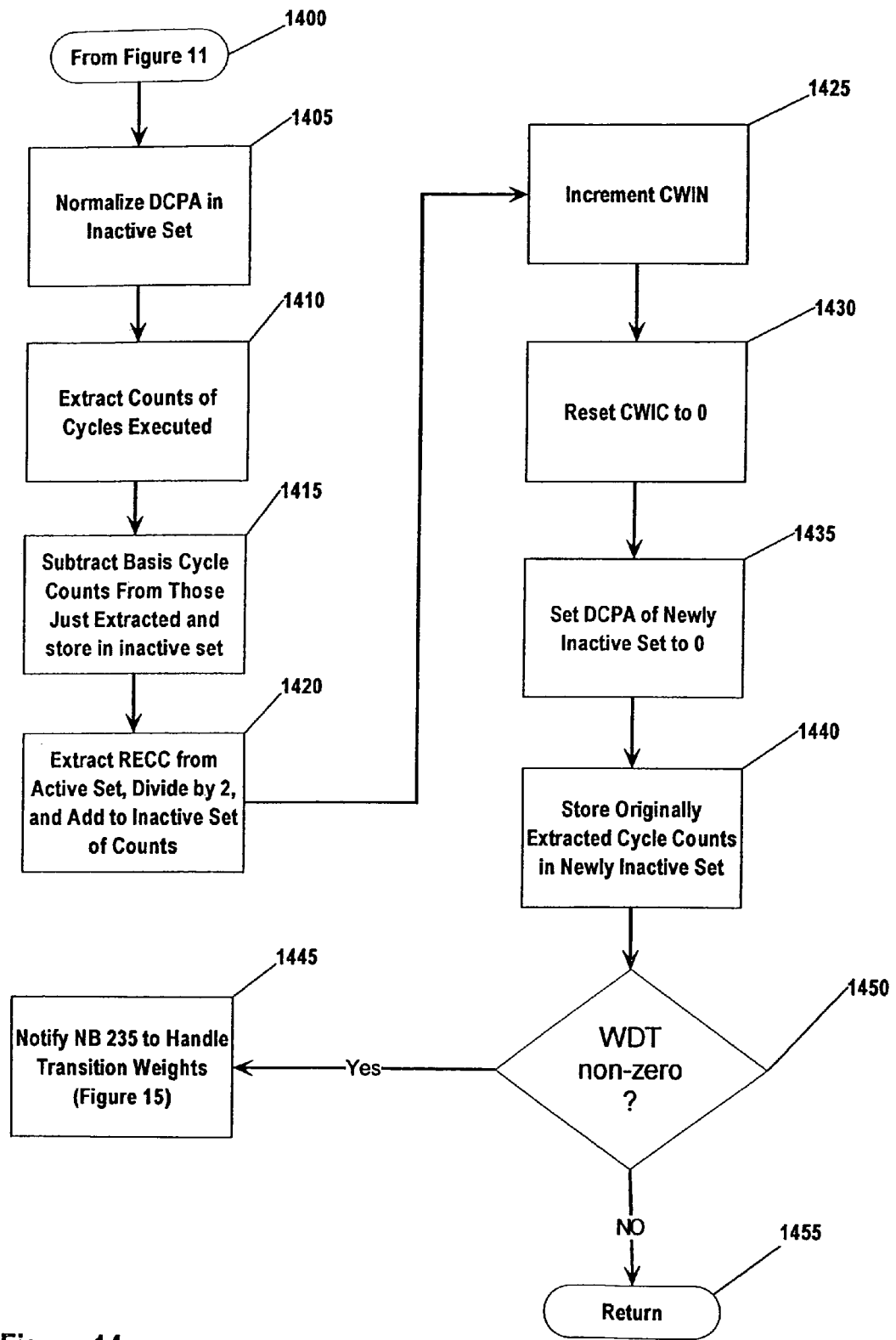

The Watch Dog Handler 225 processing of completed Current Weight Intervals is shown on FIG. 14. In step 1405, the DCP accumulations in the inactive set (see DCPA sets 2912 and 2916 of FIG. 29A) is normalized. (The determination of which set of DCPA is inactive is determined above through examination of CWIN 2908, odd CWIN 2908 is SET0 and even CWIN 2908 is SET1.) In the preferred embodiment, this normalization is handled by dividing the accumulations by the number of invocations in the interval (i.e., seven). It should be noted here that certain steps shown on FIG. 14 (namely blocks 1405 and 1435) do not pertain to Kernel Component Balancing Notification. The material is discussed here, however, because the steps are performed at the conclusion of a Current Weight Interval.

Watch Dog Handler 225 next extracts the Current Weight cycle counts collected by Dispatch Handler 230 [block 1410]. In the preferred embodiment, these counts are stored on a home node basis in processor-based data structures (not shown). Watch Dog Handler 225 then subtracts the previously stored cycle counts in the inactive set (see RECC of FIG. 29A) from the just obtained cycle counts to arrive at the number of cycles executed during the expired CWI for each home node. This result is then stored back in the inactive set replacing the previous value [block 1415]. In block 1420, the RECC from the active set is extracted, divided by two, and then added to the values (on a nodal basis) in the inactive set. This results in values which are viewed in the preferred embodiment as recently executed cycle counts.

Figure 8:
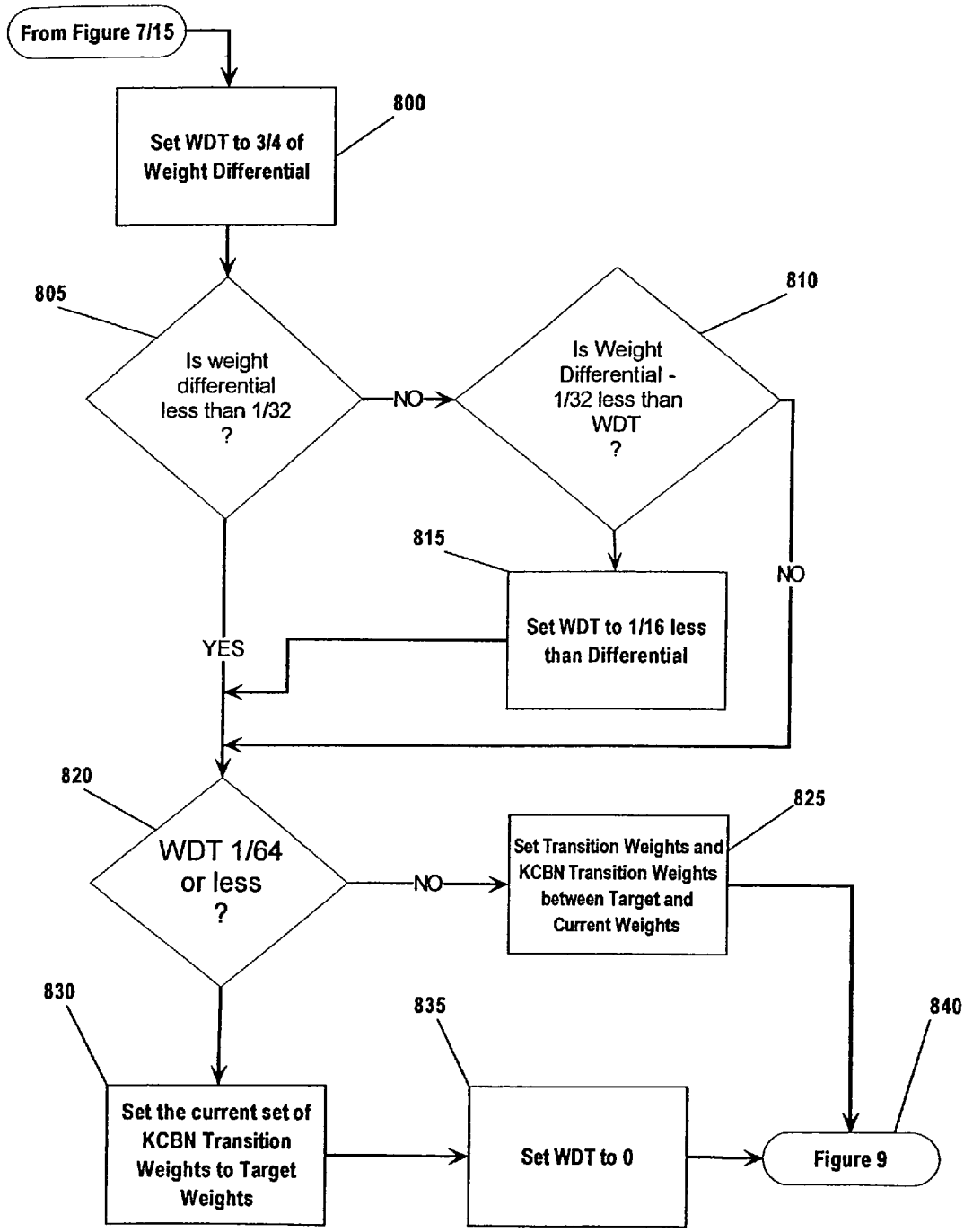
Figure 15:
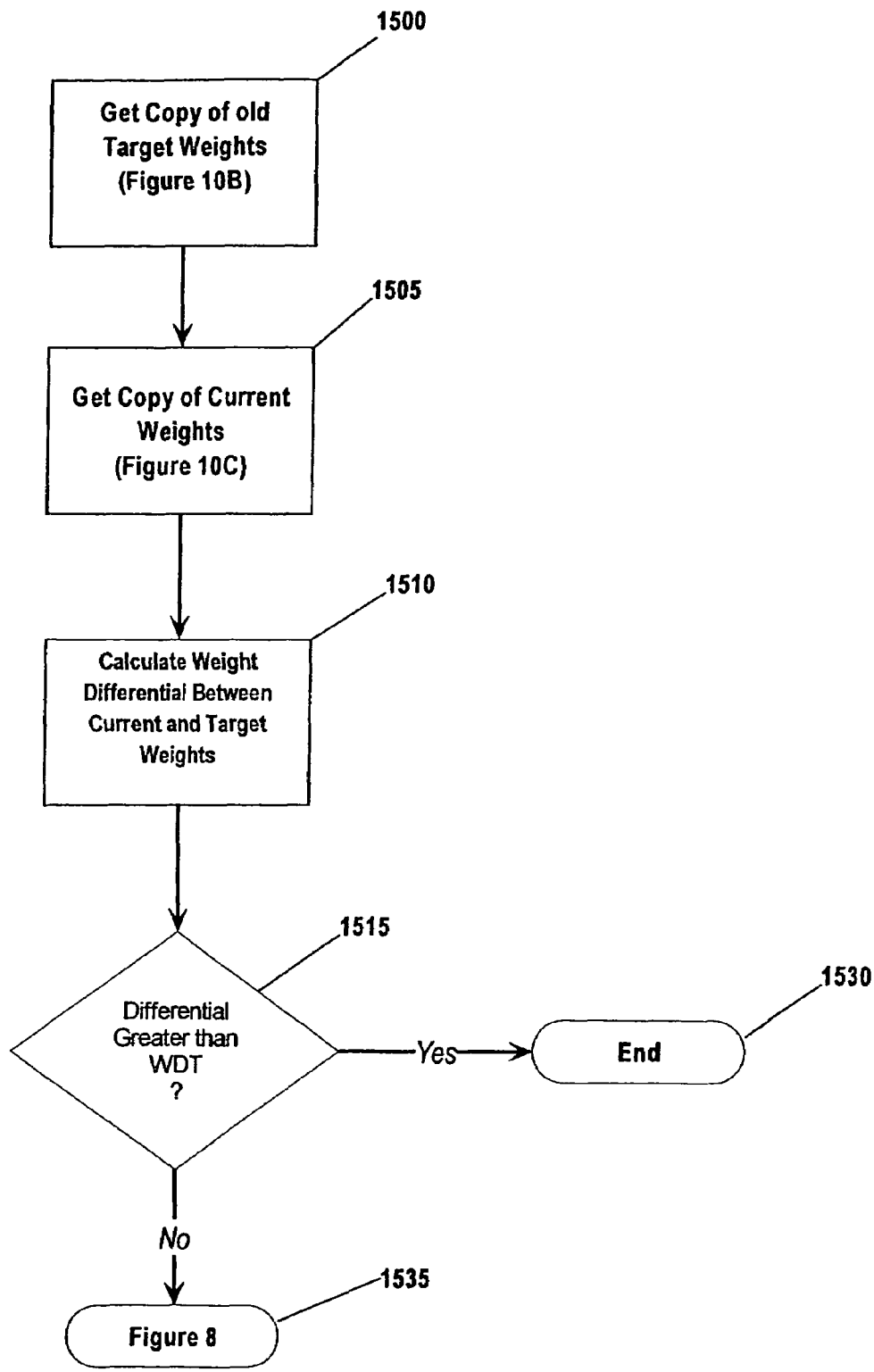

CWIN 2908 is then incremented in block 1425 to switch the inactive set (i.e., the set with the latest counts) to the active set. CWIC 2910 is then set to zero in block 1430 as a start to a new CWI. Watch Dog Handler 225 then stores the counts collected in block 1410 into the newly switched inactive set to form the basis for these same calculations (i.e., at the end of the next CWI) [block 1440]. WDT 2924 is then tested against zero in block 1450. The combination of a non-zero WDT and the conclusion of a Current Weight Interval signals the need to determine whether Transition Weights need to be recalculated. FIGS. 15 and 8 outline the Transition Weight recalculation steps used in the preferred embodiment. Referring first to FIG. 15, Target Weights are obtained in block 1500.

In the preferred embodiment, the mechanism used to obtain Target Weights is represented by FIG. 10B. In block 1030 of FIG. 10B, the Target Weight Modification Number (TWMN) is extracted. Referring now to FIG. 29A, shown are Target Weight sets 2922 and Target Weight Modification Number (TWMN) 2920. As shown, there are two sets of Target Weights used in the preferred embodiment (SET0 and SET1). TWMN 2920 is used to determine which set is the active set and which set is the inactive set. If TWMN 2920 is an odd number, SET1 is the active set and SET0 is the inactive set. If TWMN 2920 is an even number, SET0 is the active set and SET1 is the inactive set. Node Balancer 235 then tests TWMN 2920 to determine whether it is odd or even [block 1032]. If TWMN 2920 is even, the Target Weights for each node are extracted from SET0 [block 1034], but if TWMN 2920 is odd, the Target Weights for each node are extracted from SET1 [block 1036]. TWMN 2920 is then extracted again in block 1038 and tested for change in block 1040. If TWMN 2920 is unchanged, the previously extracted set of Target Weights are returned in block 1042. If TWMN 2920 has changed, the steps of testing for odd/even, set extraction, and change testing are repeated until TWMN 2920 is found to be unchanged. The requirement that TWMN 2920 be found in an unchanged state is for atomicity purposes. The Rebalancing Work and Home Node Assignment sections of this patent outline instances Node Balancer 235 is retrieving the Target Weight values while TWMN 2920 could be being incremented.

Returning now to FIG. 15, Current Weights are obtained in block 1505. Please refer to the preceding discussion of FIG. 10C for details on the steps used in the preferred embodiment to obtain Current Weights. A weight differential is then calculated between the Current Weights and the Target Weights. As previously described, the differential is the sum of the absolute values of the weight differences for each node. The differential is then tested against WDT 2924. If the differential is greater than WDT 2924, the Transition Weights do not need to be recalculated. However, if the differential is less than or equal to WDT 2924, the Transition Weights are recalculated using the above-described processing associated with FIGS. 8 and 9. Please refer to the description of those Figures for more information.

Home Node Assignment

Returning briefly to FIG. 2, TCM 205 is used in the preferred embodiment to create executable threads along with the necessary thread control structures. Part of the creation process is the assignment of a home node to these executable threads. Home node assignment is important because TDM 215 is biased to execute threads on their assigned Home Node when possible and TMM 217 is biased to allocate memory for threads on their assigned Home Node when possible. The implications of this bias pertain to overall system utilization and to resource allocation. In the preferred embodiment the assignment of a Home Node to a thread means that the system will preferentially execute the thread on its Home Node and assign memory on its Home Node. This is referred to herein as Nodal Affinity. Of course, if a particular node is configured with only one processor, this affinity becomes Processor Affinity. In addition, those skilled in the art will appreciate that the present invention is not limited to the particular type of affinity provided by the preferred embodiment. For example, a tight affinity that amounted to a requirement to always execute a thread on its Home Node would also fall within the spirit and scope of the present invention.

As discussed above, Target Weights are used in the preferred embodiment to characterize the desired work distribution throughout the system. Current Weights are used to characterize the current work distribution throughout the system. Determining a home node for a new thread would be straight forward if every thread did the same amount of work. I.e., Home Nodes would simply be assigned based on keeping the number of existing threads assigned to each node, in the same proportion as the Target Weights. The reality, though, is that different threads do different amounts of work, and it is impossible to know ahead of time how much work a thread will do. Thus, the preferred embodiment creates Initiation Weights based upon both Target Weights and Current Weights and assigns Home Nodes so as to keep the number of threads assigned to each in the same proportion as the Initiation Weights. A node whose Current Weight exceeds its Target Weight has its Initiation Weight set somewhat smaller than its Target Weight (i.e., because it already has more than its share of the work load), and a node whose Current Weight is below its Target Weight has its Initiation Weight set somewhat larger than its Target Weight (i.e., because it currently has less than its share of the work load). When calculating the Initiation Weights for each node, the Current Weights are given more influence the busier the system is.

Figure 26:
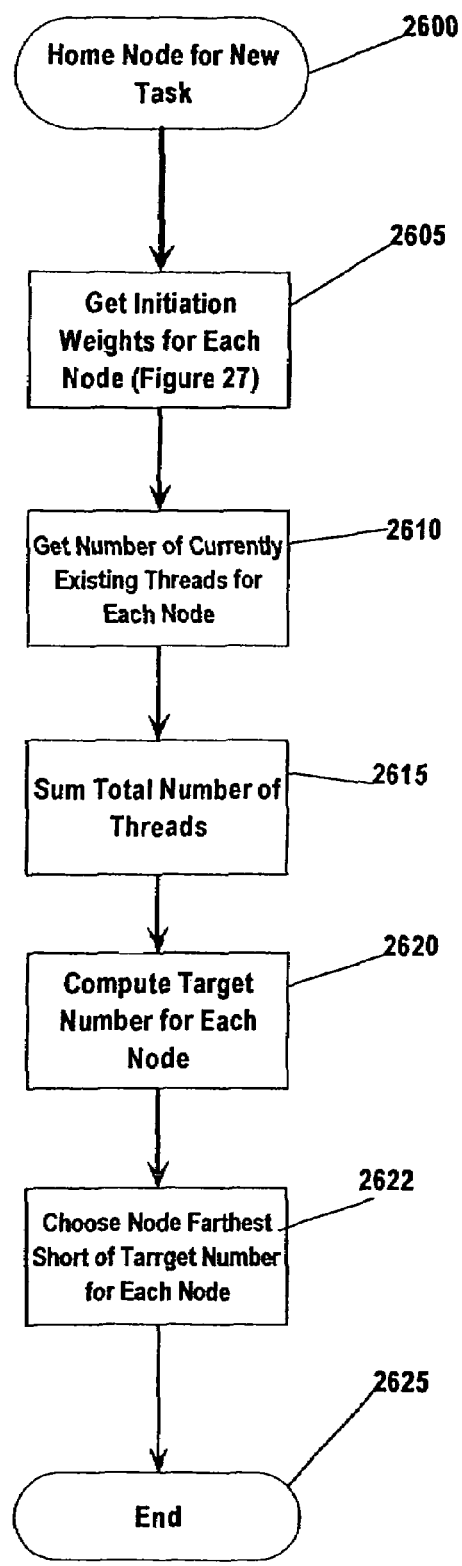
FIGS. 26-28 are flow diagrams showing highlighted steps that relate to how the Thread Creation Mechanism of the preferred embodiment performs Home Node Assignment.
Figure 27:
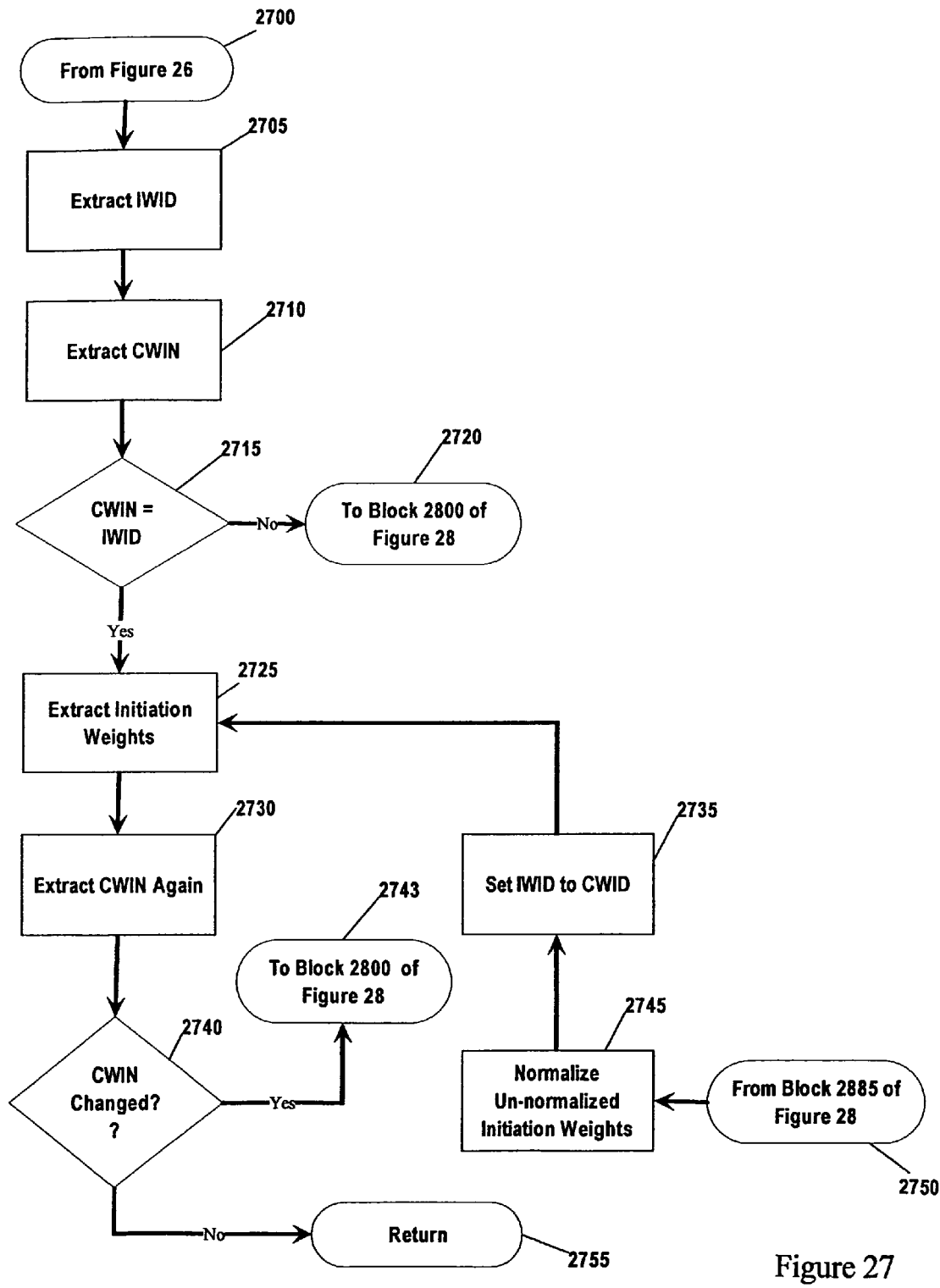
Figure 28:
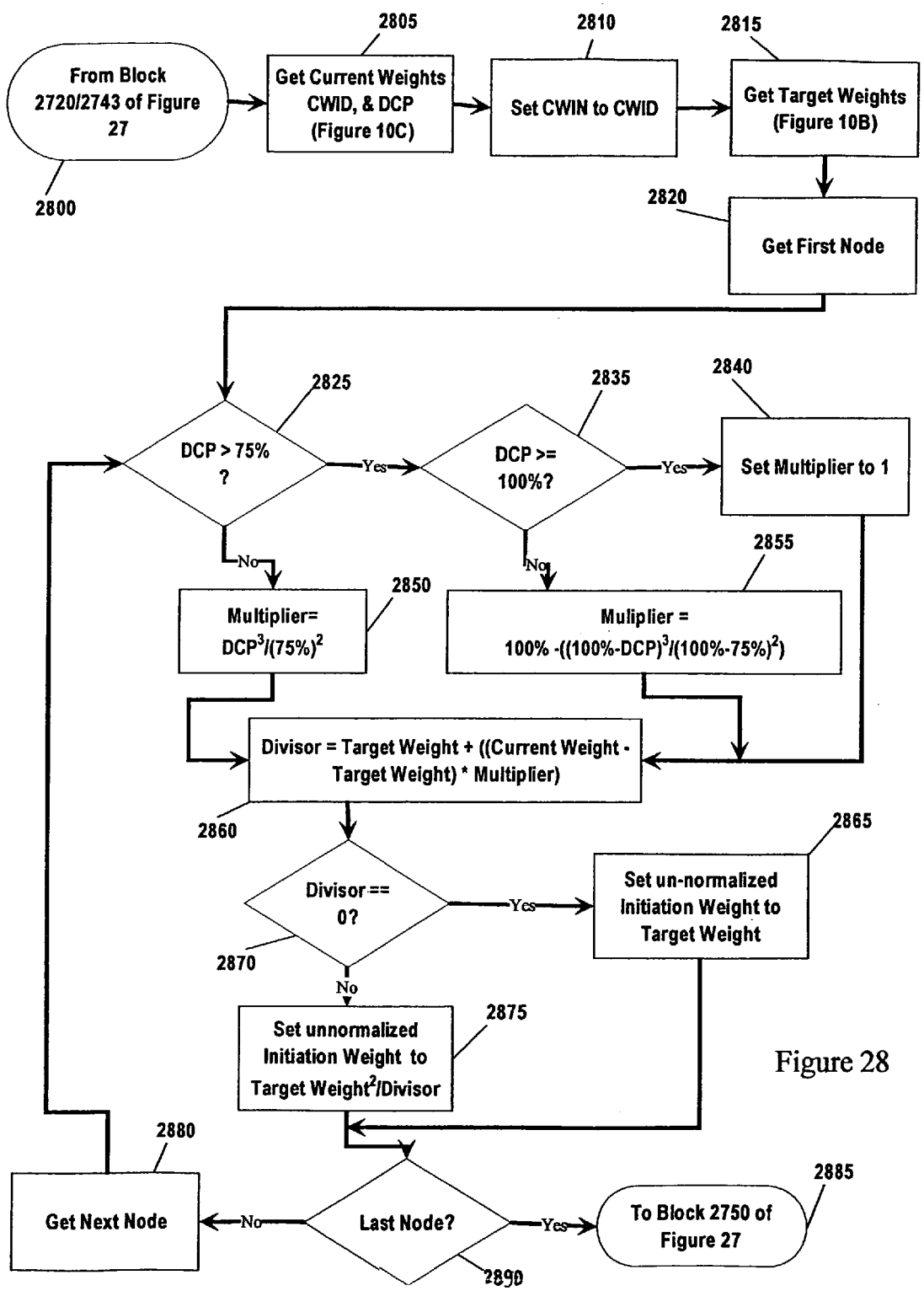

FIG. 26 shows the high level steps of home node assignment. TCM 205 obtains Initiation Weights for each node in processing block 2605. FIGS. 27 and 28 outline how this process works in the preferred embodiment. Referring now to FIG. 27, TCM 205 first extracts the Initiation Weight Identifier (IWID) in block 2705. FIG. 29B shows the IWID 2928 and Initiation Weights 2930. CWIN 2908 is then extracted in block 2710 before TCM 205 determines in block 2715 whether the IWID matches the CWIN. If the IWID does not match the CWIN, TCM 205 proceeds to block 2800 of FIG. 28 to calculate the new Initiation Weights because the existing Initiation Weights are out of date.

Current Weights, along with the CWID and DCP are obtained in block 2805. Please refer to the above description of FIG. 10C for an explanation of these steps. The value of the CWIN that was extracted in block 2710 is then set to the CWID in block 2810 so that it represents the interval number associated with the Current Weights. The Target Weights are then obtained in block 2815. Please refer to the above description of FIG. 10B for an explanation of these steps.

Starting with the first node in block 2820, TCM 205 now proceeds to combine the Target and Current Weights to produce the Initiation Weights for each node. In combining the Target and Current Weights, the higher the DCP is for a given node, the more influence the Current Weights will have in the resulting Initiation Weight for that node.

The first part of combining the weights is to calculate a multiplier that will govern the influence of the Current Weight. If the DCP is 75% or less [block 2825], the influence of the Current Weight will be suppressed by setting the multiplier equal to DCP cubed divided by the square of 75% in block 2850. Otherwise if the DCP is less than 100% [block 2835], the influence of the Current Weight will be exaggerated by setting the multiplier equal to 100% minus ((the cube of 100% minus the DCP) divided by (the square of 25%)) in block 2855. Otherwise, if the DCP is 100% or greater [block 2835], the influence of the Current Weight will be maximized by setting the multiplier equal to 100% in block 2840. Regardless of the path taken, the multiplier will be in the range of zero to 100% and is used in the second part below.

The second part of combining the weights is to calculate a divisor that will allow the Initiation Weight to be larger than the Target Weight when the Current Weight is smaller than the Target Weight, and to be smaller than the Target Weight when the Current Weight is larger than the Target Weight, according to the amount of influence the Current Weight is allowed to have. TCM 205 calculates the divisor to be the Target Weight plus ((the Current Weight minus the Target Weight) times the multiplier) in block 2860. The resulting divisor will then range somewhere between the Target Weight and the Current Weight, depending on the multiplier, and is used in the third part below.

The third part is to calculate the un-normalized Initiation Weight by dividing the square of the Target Weight by the divisor [block 2875]. This will have the affect of making the Initiation Weight larger when the Current Weight is smaller and vice-versa. In order to avoid a potential divide-by-zero, TCM 205 checks for the divisor being zero [block 2870], and if it is, it simply sets the Initiation Weight equal to the Target Weight in block 2865. TCM 205 then checks for whether there are more nodes to process [block 2890], and if so, it repeats the above processing for each of the remaining nodes. When TCM 205 does determine that all the nodes have been considered, it proceeds to block 2750 of FIG. 27. After returning to the logic of FIG. 27 via connection block 2750, TCM 205 normalizes the un-normalized Initiation Weights and stores them in Initiation Weights 2930 [block 2745]. In the preferred embodiment, the Initiation Weights are normalized by dividing each weight by the sum of all of the Initiation Weights for all of the nodes. The IWID is then set to the CWID in block 2735 to specify the Current Weight Interval during which the Initiation Weights are valid.

The currently-described execution path and the Yes branch from block 2715 (see above description) converge at block 2725. There, TCM extracts the Initiation Weights and then proceeds to extract the CWIN again. If the newly extracted CWIN is different from the previously extracted CWIN and then the Initiation Weights are out of date and the previously described Initiation Weight calculation steps begin anew with block 2805 of FIG. 28. If the newly extracted CWIN is the same as the previously extracted CWIN, the extracted Initiation Weights are up to date and are returned to the logic of FIG. 26.

Returning now to block 2610 of FIG. 26, TCM 205 determines the number of currently existing threads for each node. In the preferred embodiment, Kernel Services 137 tracks existing threads on a nodal basis by incrementing a counter when a thread is created and decrementing it when a thread is destroyed. The total number of threads is then determined by summing the counters [block 2615]. Then in block 2620 a target number of threads is determined on a nodal basis. In the preferred embodiment, this is accomplished by multiplying the total number of threads by each node's Initiation Weight. The node which has the largest short fall between actual threads and target threads is the node chosen as the home for the just-created thread [block 2622].

Work Redistribution

Overview

We discussed above how the preferred embodiment of the present invention is able to detect work imbalances within the system and make appropriate adjustments. This is accomplished in the preferred embodiment through a series of state driven interactions between Watch Dog Handler 225, Dispatch Handler 230, and Node Balancer 235. The states used in the preferred embodiment for Work Redistribution purposes are named Observe Balance, Record Cycles, and Move Threads. The Observe Balance state, which is the starting point, is set by the system administrator. Thus, the system administrator enables the system to determine whether work balance issues exist. When the state is set to Observe Balance, Watch Dog Handler 225 tracks a fifty three (53) second period referred to herein as the Observe Balance Interval (OBI). After a certain number of intervals have passed, six in the case of the preferred embodiment, Watch Dog Handler 225 notifies Node Balancer 235.

When Node Balancer 235 wakes it notes that the state is set to Observe Balance. Node Balancer 235 responds by performing a high level analysis of whether or not the system is out of balance. While this determination is explained in more detail in subsequent paragraphs, it should be noted here that Dispatch Handler 230, which runs very frequently, is tracking the number of cycles executed on a Home Node basis. This raw cycle count is used by Node Balancer 235 to make its high level balance determination. When Node Balancer 235 determines that the system's work load is potentially out of balance, it sets the state to Record Cycles and notifies Watch Dog Handler 225 accordingly.

Watch Dog Handler 225 then recognizes that the state has been changed to Record Cycles, and after tracking through a single Record Cycles Interval sets the state to Move Threads and notifies Node Balancer 235. In the mean time Dispatch Handler 230 recognizes that the state had been set to Record Cycles by Node Balancer 235. Dispatch Handler 230 responds by collecting cycle data both on a thread basis and on a Home Node basis. Dispatch Handler 230 stops collecting cycle data on a thread basis when it later determines that the state has been changed to something other than Record Cycles.

When Node Balancer 235 receives the aforementioned notification from Watch Dog Handler 225, it proceeds to perform a lower level analysis of the thread-based data that was collected by Dispatch Handler 230. Node Balancer 235 then double checks the balanced/unbalanced state of the system and uses thread-based data to determine which threads to move in cases where the system's work load is not appropriately balanced. If Node Balancer 235 determines that the system's work load is not balanced, it proceeds to move threads amongst the nodes to more appropriately balance the system's work load. Finally, Node Balancer 235 sets the state back to Observe Balance to start the processing over.

Dispatch Handler 230 in Observe Balance State

Figure 16A:
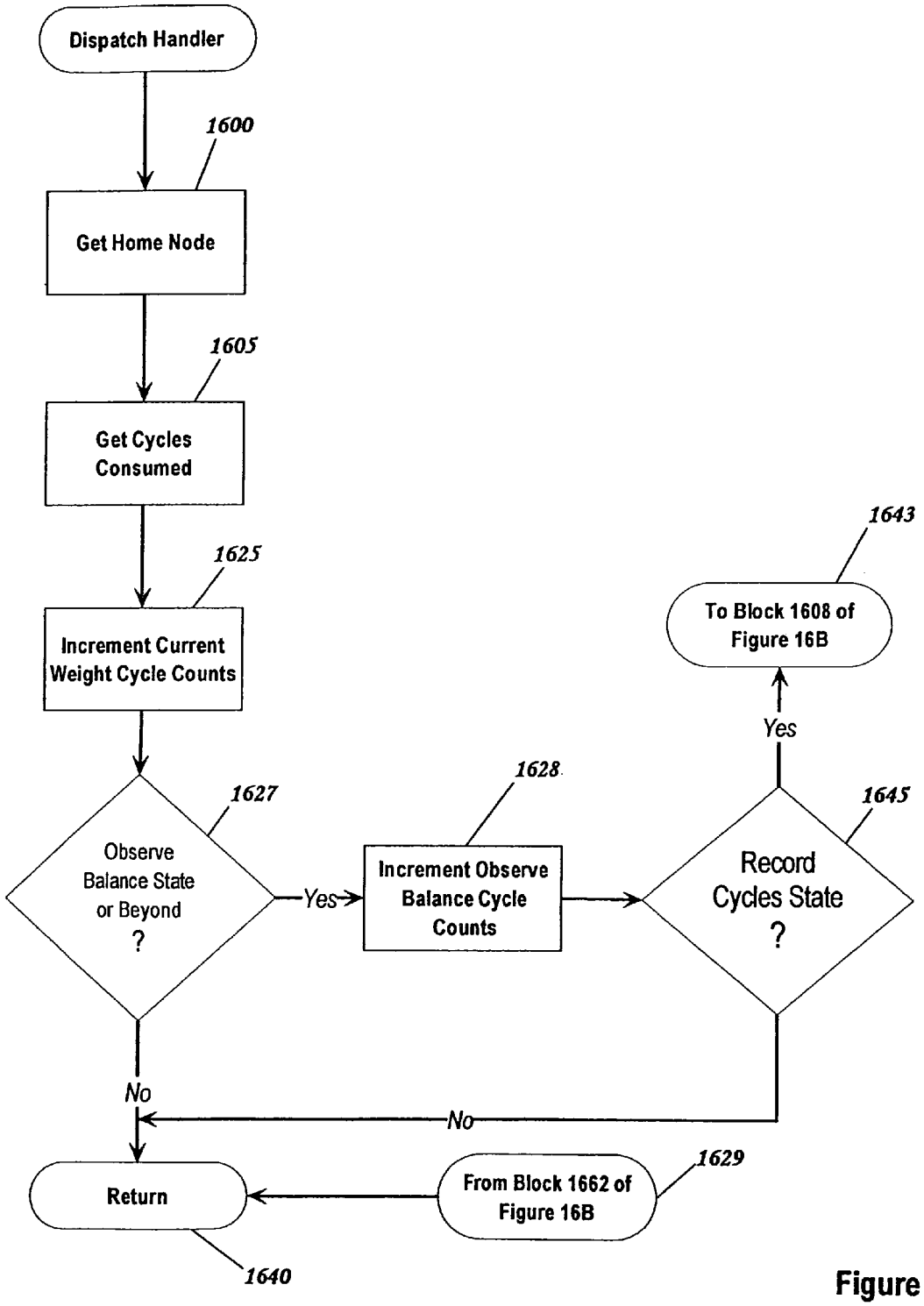
Figure 16B:
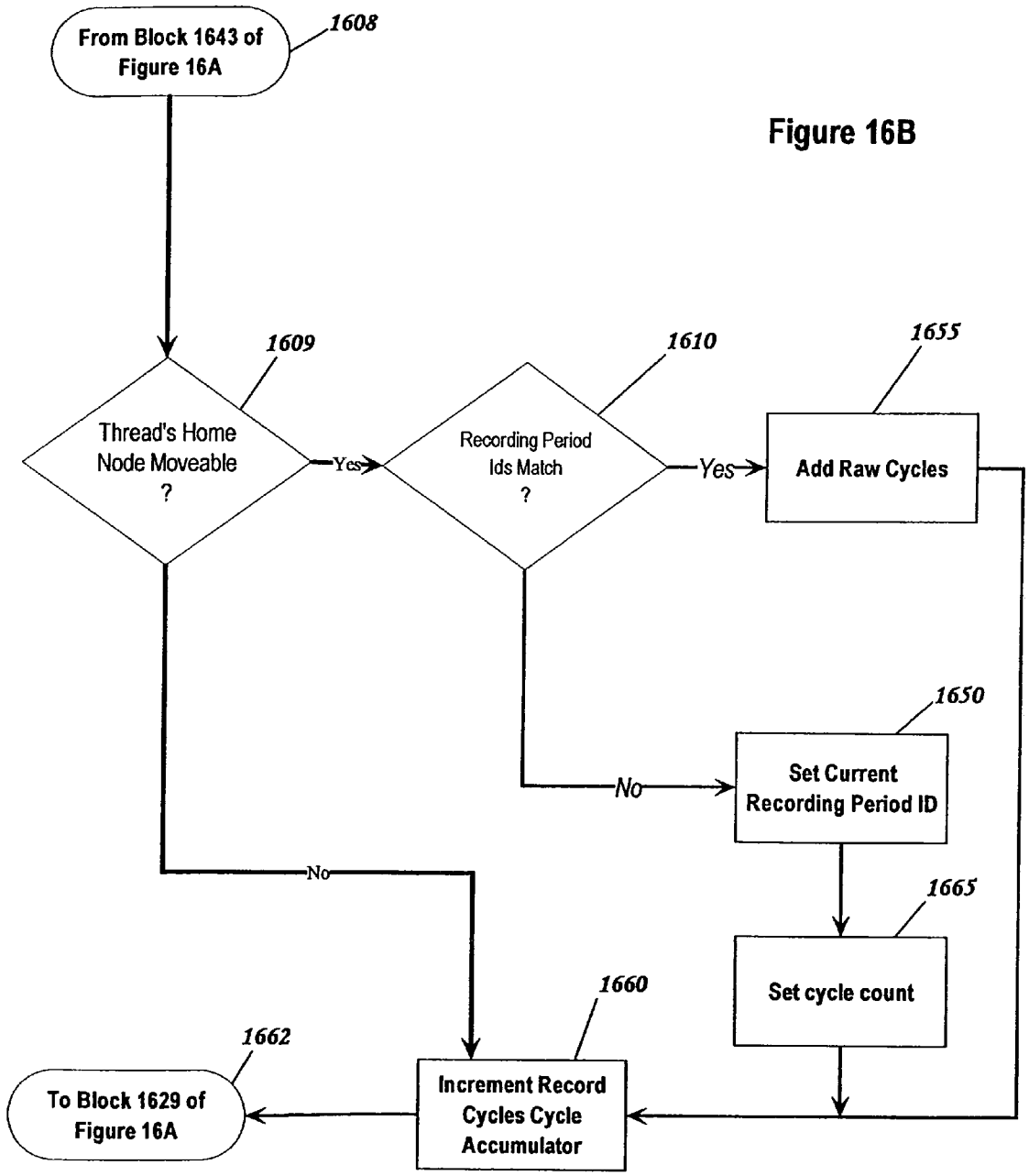

Just mentioned was the fact that Dispatch Handler 230, when in the Observe Balance state, keeps a raw count of the number of cycles executed on a Home Node basis. This logic is shown on FIG. 16A. Shown on FIG. 16A are the steps within Dispatch Handler 230 that are pertinent to the preferred embodiment of the present invention. Those skilled in the art appreciate that other unrelated thread dispatch processing exists. In block 1600, Dispatch Handler 230 obtains the Home Node ID for the thread that is about to be dispatched. The cycles consumed the last time this particular thread executed is then obtained in block 1605. The consumed cycle count is then added to a Current Weight Cycle count accumulator on a Home Node basis. This count, which is kept by Dispatch Handler 230, is stored in a processor-based data structure (not shown). Dispatcher 230 then determines whether it is in the Observe Balance state or beyond. If so, the consumed cycles described above are added to a Observe Balance Cycle count accumulator, which is another processor-based data store maintained by Dispatch Handler 230 (not shown). Dispatch Handler 230 then determines whether it is in the Record Cycles state [block 1645]. Since here we are in the Observe Balance state, Dispatch Handler 230 simply returns in block 1640, where the remaining thread dispatch processing occurs. The logic of FIG. 16B is described below in connection with the Record Cycles state.

Watch Dog Handler 225 in Observe Balance State

Figure 11:
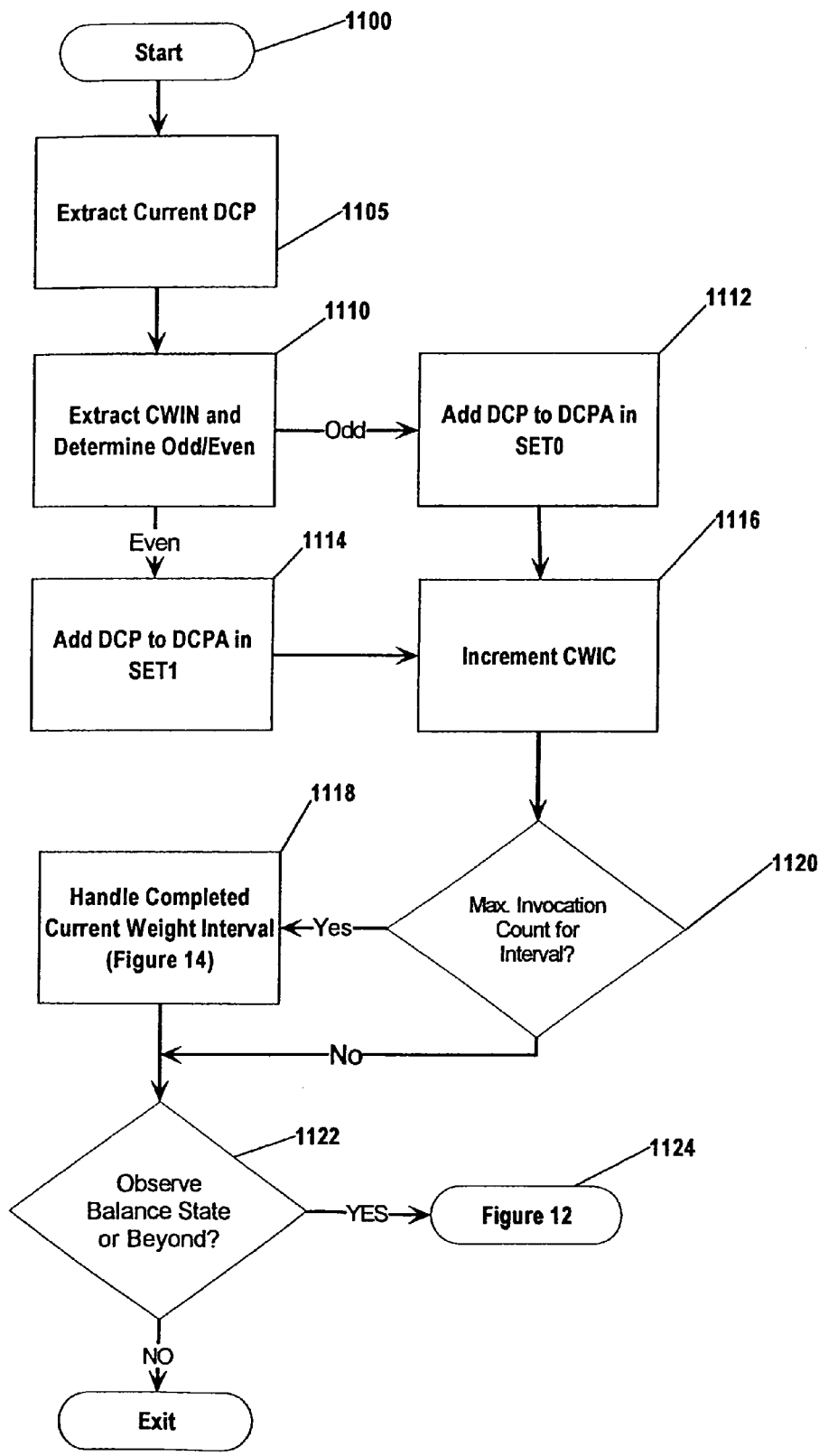

FIG. 11 was discussed earlier with respect to Kernel Component Balancing Notification. During that discussion it was mentioned that certain of these processing blocks (i.e., of Watch Dog Handler 225) pertained to Work Redistribution. These blocks will now be described. In block 1105, the current Dispatcher Commitment Percentages are obtained. In the preferred embodiment, these are obtained through a system interface that is not important to the benefits and advantages of the present invention, and thus is not described further herein. The percentages represent an indication of the level of activity of the system on a nodal basis. Like RECC, the inactive set is identified through examination of CWIN 2908 (see DCPA sets 2912 and 2916 of FIG. 29A.) [block 1110]. If CWIN 2908 is odd, the DCP is added to the DCPA in SET0; if CWIN 2908 is even the DCP is added to the DCPA in SET1. Watch Dog Handler 225 then determines whether CWIC 2910 has reached its maximum [block 1120]. If the maximum has been reached, Watch Dog Handler 225 proceeds to handle a completed Current Weight Interval. This processing has been previously described with reference to FIG. 14 (see above). The reader is asked to assume here that completed Current Weight Interval handling is not at issue. Watch Dog Handler 225 will, therefore, determine whether the current state is Observe Balance or beyond [block 1122].

Figure 12:
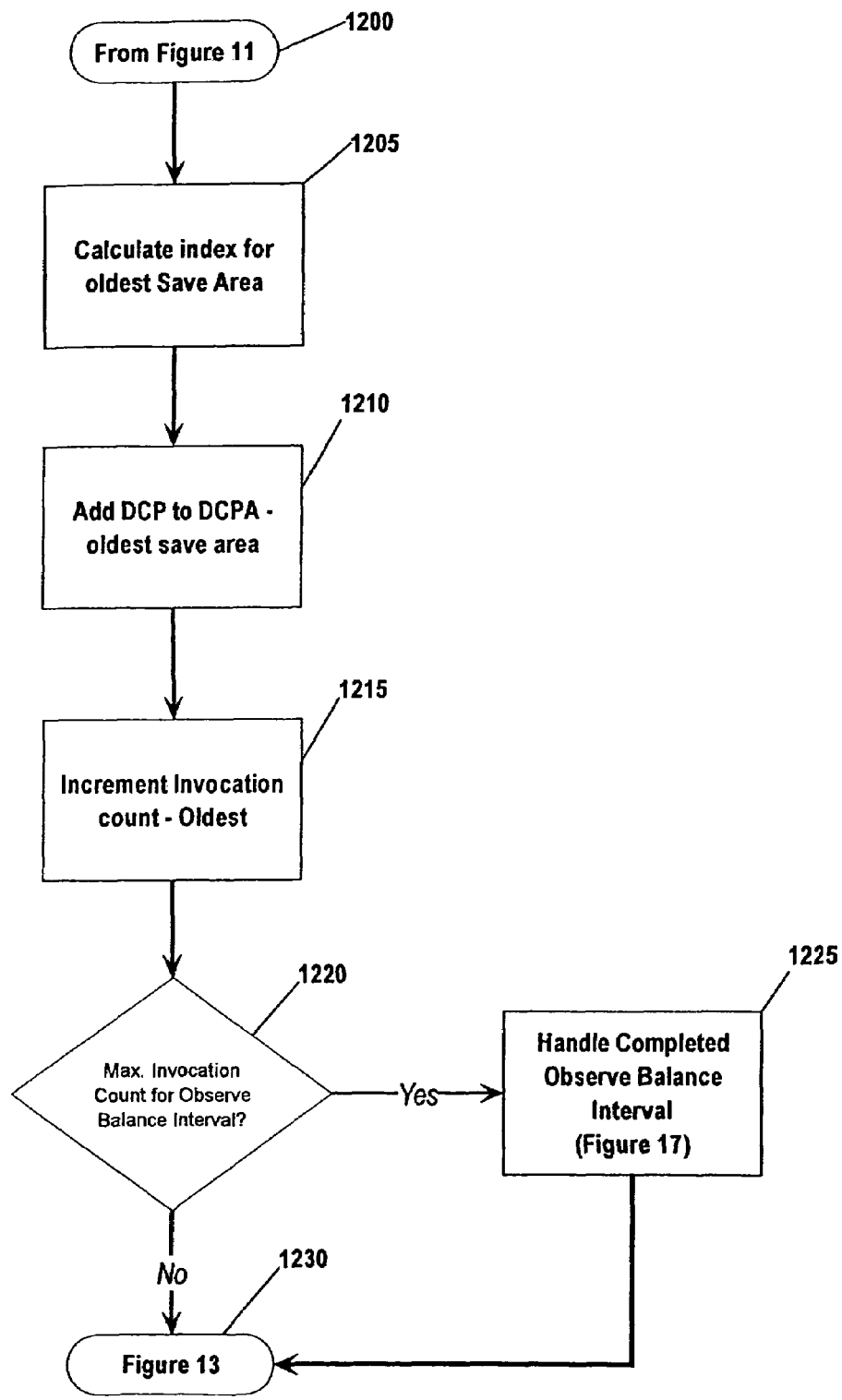
Figure 13:
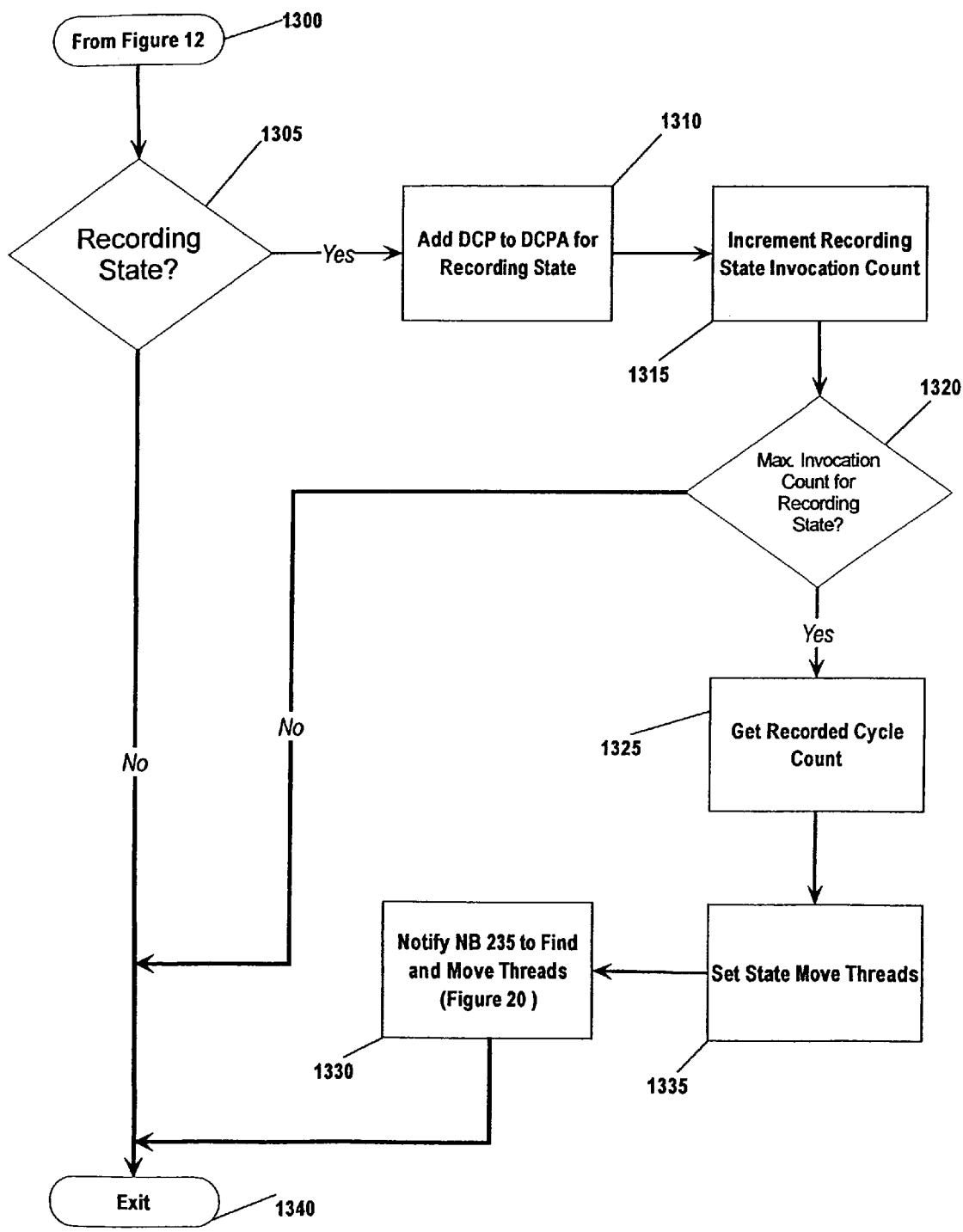
Figure 17:
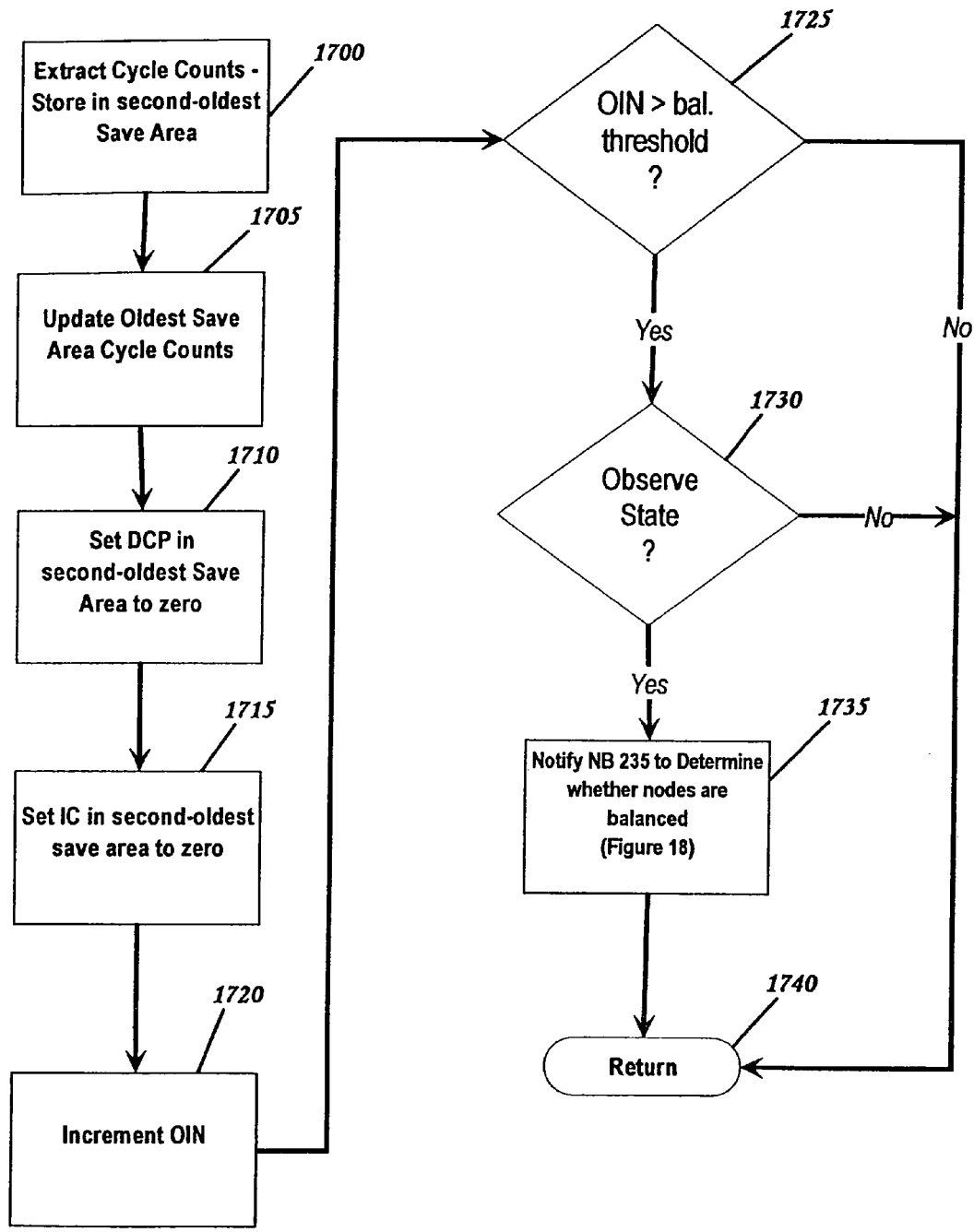

Here the current state is Observe Balance, so Watch Dog Handler 225 moves to block 1205 of FIG. 12. There Watch Dog Handler 225 calculates the index to the oldest save area (see FIG. 29B, save areas SA0-SAN, 2932-2936). In the preferred embodiment, this calculation involves extracting Observe Interval Number (OIN) 2950 of FIG. 29B and dividing OIN 2950 by the number of save areas (i.e., N+1), and then using the resulting remainder as the index. Watch Dog Handler 225 then adds the DCP to the DCPA of the oldest save area on a nodal basis [block 1210]. The invocation count (IC) of the oldest save area is then incremented [block 1215]. Watch Dog Handler 225 then determines whether the maximum invocation count has been reached [block 1220]. If so, an Observe Interval has completed, which requires handling. This processing is shown in FIG. 17. If an Observe Interval has not completed, processing continues in FIG. 13.

Turning first to FIG. 17, Watch Dog Handler 225 first obtains the Observe Balance Cycle counts from Dispatch Handler 230 and store them on a nodal basis in the second oldest save area [block 1700]. (Again, see FIG. 29B, save areas SA0-SAN, 2932-2936.) These values will eventually become the basis for the number of cycles executed in the next Observe Interval. Then, in block 1705, Watch Dog Handler 225 will calculate the cycles executed in the just-completed Observe Interval. In the preferred embodiment, this is done by subtracting the cycle counts in the oldest save area, which were the basis for the just-completed Observe Interval, from the counts obtained in block 1700. The results of this calculation are then stored back into the oldest save area. In block 1710, Watch Dog Handler 225 sets the DCPA of the second oldest save area to zero. This is done in preparation for accumulation for the next Observe Interval. Watch Dog Handler 225 then sets the invocation count for the second oldest save area to zero, again in preparation for accumulation in the next interval [block 1715]. OIN 2950 is then incremented, which has the effect of atomically changing the oldest save area into the newest and the second oldest into the oldest [block 1720].

In block 1725, Watch Dog Handler 225 determines whether OIN 2950 has reached the Observe Balance Threshold. This value is used in the preferred embodiment to determine when Node Balancer 235 should check whether the nodes of the system are balanced from a work load perspective. In the preferred embodiment, this value is six (6). If the Observe Balance Threshold has not been reached, Watch Dog Handler 225 returns to the logic of FIG. 12 in block 1740. If the Observe Balance Threshold has been reached, Watch Dog Handler 225 determines whether the current state is Observe Balance (see node manager state 2902 of FIG. 29A). If the current state is not Observe Balance, Watch Dog Handler 225 returns to the logic of FIG. 12 in block 1740. Here the state is Observe Balance, so Watch Dog Handler 225 notifies Node Balancer 235 to make a high level determination of whether the work being performed by the system is properly balanced amongst the nodes of the system before returning to the logic of FIG. 12 [block 1740]. This logic is described in connection with FIG. 18.

Node Balancer 235 in Observe Balance State

Figure 18:
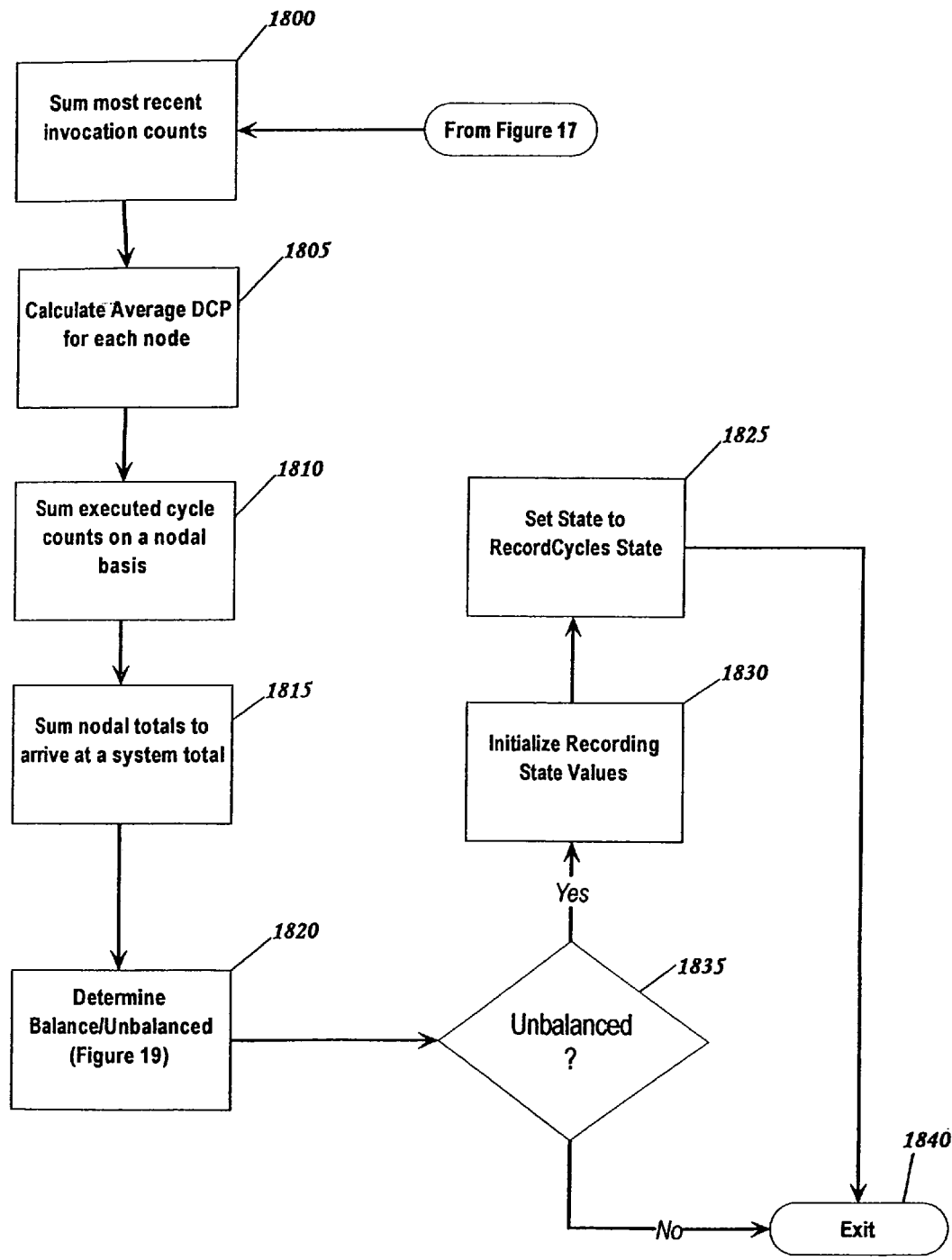
Figure 19:
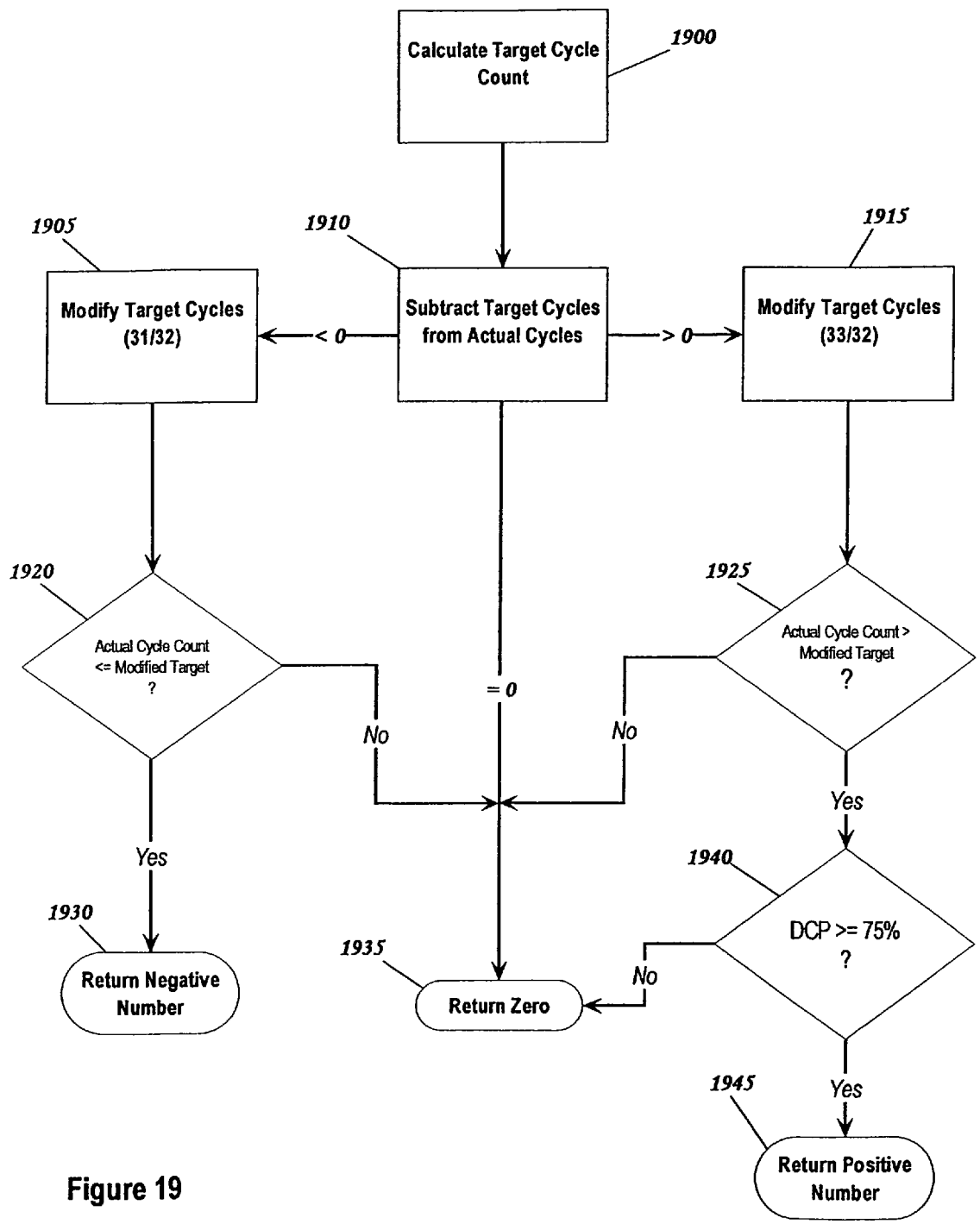

Turning now to FIG. 18, Node Balancer 235 proceeds to sum the invocation counts of the six most recent save areas [block 1800]. Node Balancer 235 then calculates an average DCP for each node [block 1805]. In the preferred embodiment, this is accomplished by first summing the DCPA on a nodal basis from the most recent six save areas. The total for each node is then divided by sum of the invocation counts (i.e., the value determined in block 1800). The result is an average DCP for each node. Node Balancer 235 then sums the Observe Balance Cycle counts on a nodal basis for the six most recent save areas [block 1810]. (See FIG. 29B, Cycle Counts and save areas SA0-SAN, 2932-2936.) A system total is then determined in block 1815. The steps for making the Balanced/Unbalanced determination continue on FIG. 19. The logic of FIG. 19 is used by Node Balancer 235 once for each node. Each time the logic of FIG. 19 is used, the following inputs are considered: 1) the total Cycle Counts for the system, 2) DCP for the node under consideration, 3) the node's Target Weight (see FIG. 10B and the associated text for an explanation of how Target Weights are calculated), and 4) the cycle count for the particular node.

Moving now to FIG. 19, Node Balancer 235 proceeds to calculate the target cycle count in block 1900. In the preferred embodiment, this is accomplished by multiplying the total cycles executed across all nodes by the particular node's Target Weight. The result is a target cycle count for the node at issue. The target cycle count is then subtracted from the node's cycle count [block 1910].

In the preferred embodiment, $\frac{1}{32}$ of the target cycles count is used as a tolerance, so that if the actual cycle count is within $\frac{1}{32}$ of the target cycle counts, the node is said to be balanced even though it may be slightly out of balance. Application of this tolerance can be seen in the logic of processing block pairs 1905/1920 and 1915/1925. If the actual cycle count is only slightly less than the target cycle count [blocks 1905 and 1920], a result of zero is returned [block 1935]. A result of zero indicates that no imbalance is seen for the particular node. Similarly, if the actual cycle count is only slightly more than the target cycle count [blocks 1915 and 1925], a result of zero is returned [block 1935]. Of course, if the result of the calculation of block 1910 is zero, zero is returned in block 1935. If the difference between actual cycle count and target cycles is more than slightly low, the logic of FIG. 19 will return the difference between the actual and target cycle counts as a negative number [block 1930], which indicates the amount of additional work the particular node is capable of taking on without exceeding its fair proportion. If the difference between the actual cycle count and target cycles is more than slightly high, the logic of FIG. 19 will test whether the DCP for the particular node is greater than 75%. An overage of cycle count and a DCP of greater than %75 indicates that the node has more than its fair share of work, and is in fact suffering from the overage. When this is found to be the case, the logic of FIG. 19 will return the difference between the actual cycle and target cycle count as a positive number [block 1945], which indicates the amount of work that should be moved from the node at issue. If in block 1940, the logic of FIG. 19 determines that the DCP of the particular node is not over 75% despite the overage of cycle count, the node is not treated as being over worked [block 1935].

Figure 29C:
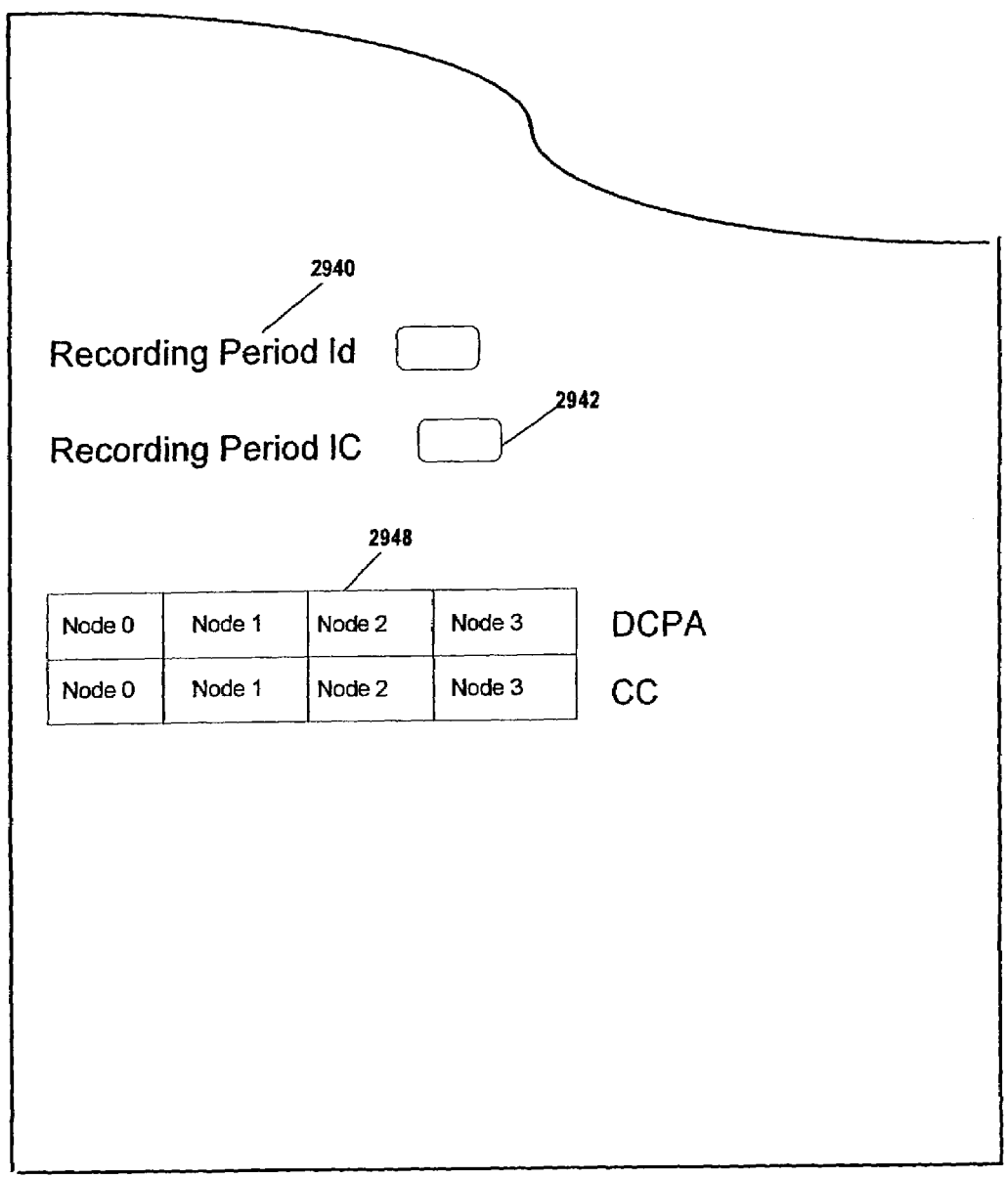

Recalling that the logic of FIG. 19 is used for each node, and returning now to FIG. 18 with the assumption that all of the nodes have been considered, if the result of the logic of FIG. 19 shows that there is not an imbalance of work (i.e., that the work is distributed appropriately throughout the system), Node Balancer 235 simply terminates execution in block 1840. However, if the logic of shows an imbalance (i.e., at least one node with too much work and at least one node with too little work), Node Balancer 235 proceeds to block 1830 where the Recording State values are initialized. The initialization are as follows: 1) Recording Period Id. 2940 of FIG. 29C is incremented, 2) cycle counts 2948 is set to zero on a Home Node basis, 3) Recording Period Invocation Count 2942 is set to zero, 4) the DCPA 2948 for each node is set to zero. Node Manager State 2902 is then set to Record Cycles [block 1825] before Node Balancer 235 terminates execution in block 1840.

Dispatch Handler in Record Cycles State

The state has now been set to Record Cycles by Node Balancer 235 (see above), so processing block 1645 of Dispatch Handler 230 will evaluate to Yes the next time a thread is dispatched. Accordingly, Dispatch Handler 230 will next determine whether the thread's Home Node is moveable [block 1609 of FIG. 16B]. If not, Dispatch Handler 230 simply increments the Record Cycles cycle accumulator in block 1660 before returning to the logic of FIG. 16A. If so, Dispatch Handler 230 determines whether the recording period IDs match [block 1610]. This determination is made by comparing the recording period ID kept in the thread control structure (not shown) with Recording Period ID 2940 of FIG. 29C. If the IDs match, Dispatch Handler 230 adds the raw cycles counted to the existing total already stored in the thread structure (not shown) {block 1655]. When the IDs do not match, raw cycle counts for the current period have not yet been stored this particular thread's control structure, so the recording period ID in the thread control structure is set to the value stored in Recording Period ID 2940 [block 1650] and the cycle count is set to equal the cycles most recently executed [block 1665]. This is the value ascertained in block 1605. Regardless of how processing block 1610 evaluates, the Home Node total of recorded cycles is also incremented in block 1660.

Watch Dog Handler 225 in Record Cycles State

Returning now to FIG. 13 to continue, the next time Watch Dog Handler 225 executes processing block 1305 will evaluate to Yes because state 2902 is now set to Record Cycles by Node Balancer 235. Watch Dog Handler 225 adds the DCP to the Recording State DCPA (see DCPA of 2948 of FIG. 29C) [block 1310]. Recording Period IC 2942 is then incremented in block 1315. Watch Dog Handler 225 then tests Recording Period IC 2942 to determine whether the maximum has been reached. In the preferred embodiment the maximum is fifty-three. If the maximum has not been reached, Watch Dog Handler 225 simply exits in block 1340. If in block 1320, Watch Dog Handler 225 determines that the maximum has been reached, it proceeds to get the recorded cycle counts from Dispatch Handler 230 and store them in cycle count storage area 2948. Watch Dog Handler 225 then sets the state to move threads in block 1335 and notifies Node Balancer 235 to move threads in block 1330 before it exits in block 1340.

Node Balancer 235 in Move Threads State

Figure 20:
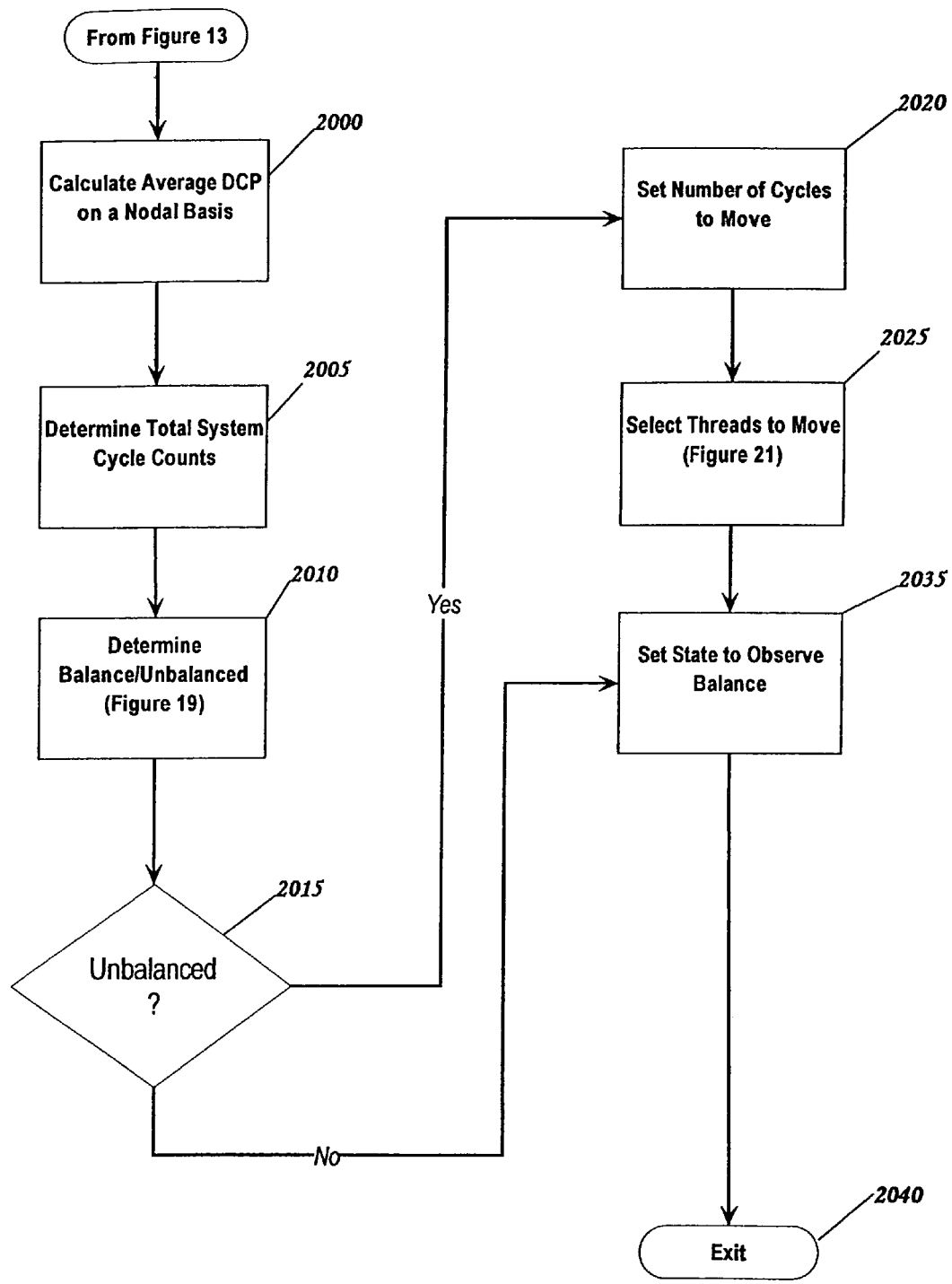

FIG. 20 is used herein to describe thread movement within the preferred embodiment. Node Balancer 235 first calculates an average DCP per node [block 2000]. In the preferred embodiment, this is accomplished by dividing the value held in DCPA of 2948 by the total number of intervals in the period (i.e., Recording Period IC 2942). Node Balancer 235 then sums the Accumulated Cycle Count of 2948, which results in a total for the system during the Recording Period [block 2005].

Node Balancer 235 next determines whether the work is fairly distributed throughout the system over the recording period. In the preferred embodiment this is accomplished via the logic shown on FIG. 19. As the reader may recall, FIG. 19 was described above, and the details will not be reiterated here. However, recalling that the logic of FIG. 19 is used for each node, and returning now to FIG. 20 with the assumption that all of the nodes have been considered, if the result of the logic of FIG. 19 shows that there is not an imbalance of work (i.e., that the work is distributed appropriately throughout the system), Node Balancer 235 simply sets the state to Observe Balance in block 2035 and terminates execution in block 2040. However, if the logic of FIG. 19 shows an imbalance (i.e., at least one node with too much work and at least one node with too little work and the same nodes were observed to have too much work and too little work respectively in the Observe Balance state), Node Balancer 235 proceeds to block 2020 where the number of cycles to move is determined. The reader is asked to first recall that nodes short on cycles and nodes with excess cycles were identified in block 2010. The number of cycles to move is then set by Node Balancer 235 to ½ of the smaller of the largest excess and the largest shortage. Node Balancer 235 then moves threads on this basis.

FIGS. 21A through 23 show the Node Balancer 235 logic used in the preferred embodiment to perform this task. Initially, in block 2100, an empty list is created. This list will eventually hold the threads that are candidates to be moved. Then, in block 2105, Node Balancer 235 selects the first (or next) thread from a list of threads maintained by the system. Node Balancer 235 then determines whether the thread has a current recording period ID associated with it [block 2110]. If not, Node Balancer 235 determines whether there are more threads to consider [block 2111], and if so, proceeds to selected the next thread [block 2105] and again determine whether the current recording period ID is associated with it [block 2110]. FIG. 21B shows the logic used to process threads having the current recording period ID. Node Balancer 235 first determines in block 2120 whether the Home Node for the thread at issue is a node that has been previously determined to have an excess of cycles. If not, processing continues in block 2111 of FIG. 21A, as has been described. If the Home Node of the thread at issue is indeed the one having excess cycles, Node Balancer 235 determines whether the particular thread is a member of a MAG, wherein all the threads of the group are required to have the same Home Node [2125]. If not, Node Balancer 235 extracts the cycles recorded by this thread [block 2130]. Node Balancer 235 then adds this thread to the candidate list, ranking it based on its number of recorded cycles (most being first). Node Balancer 235 then continues processing in block 2111 of FIG. 21A.

Figure 21A:
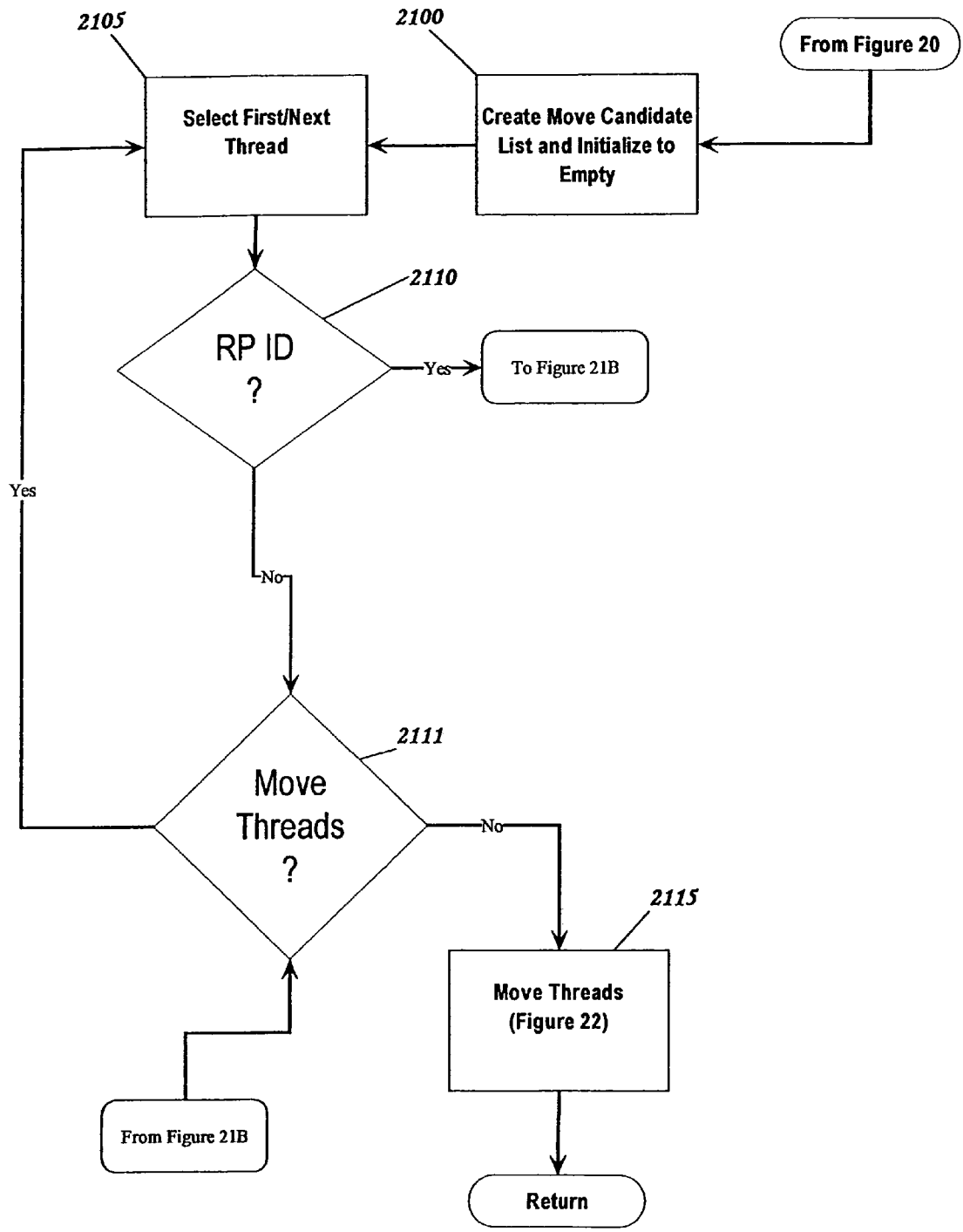
Figure 21B:
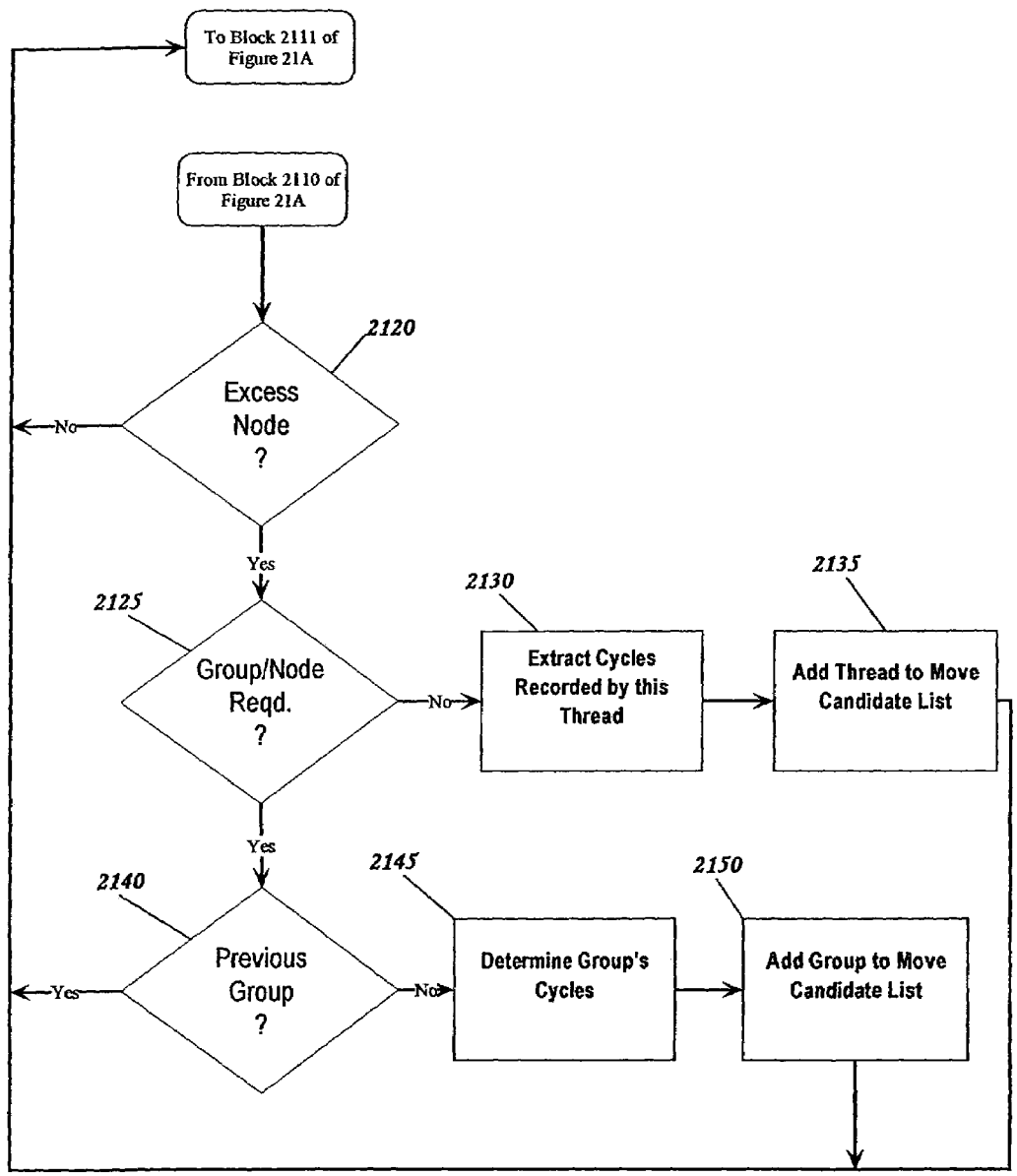

If in block 2125 of FIG. 21B Node Balancer 235 determines that the thread at issue is indeed part of a group, Node Balancer 235 determines whether the group is one that has been encountered before during this recording period [block 2140]. If so, processing continues in block 2111 of FIG. 21A. If not, Node Balancer 235 calculates the total cycle count for the group (i.e., the sum of the recorded cycles of the group's threads) [block 2145], and then adds the group to the move candidate list based on the total cycle count for the group [block 2150]. Once this is accomplished, processing continues in block 2111 of FIG. 21A.

Figure 22:
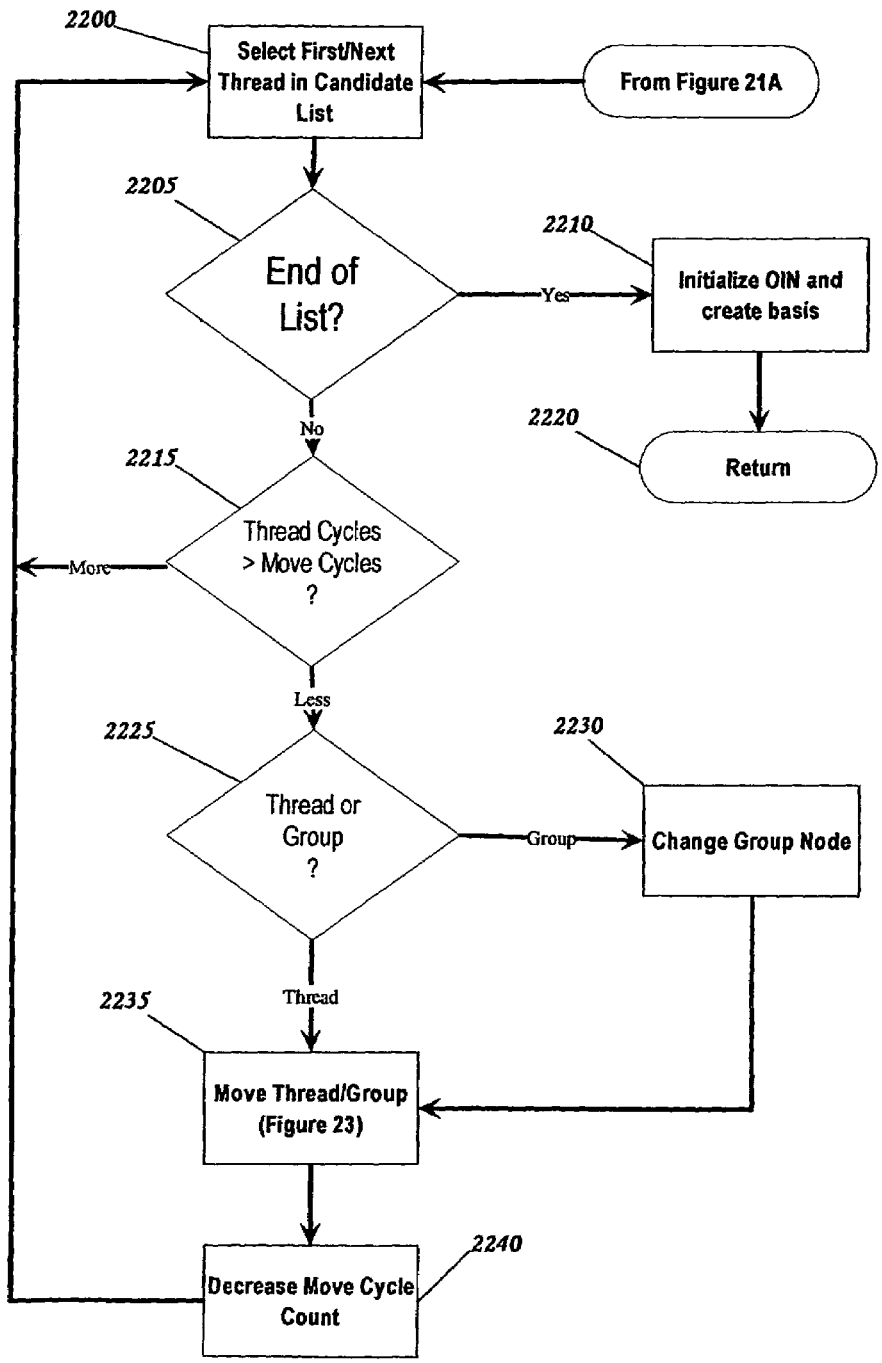

When all of the threads have been considered, processing block 2111 evaluates to No, and Node Balancer 235 proceeds to actually move threads to rebalance the system. The logic used in the preferred embodiment to accomplish this task is shown in FIG. 22. In block 2200, Node Balancer 235 selects the first (next) thread or MAG in the candidate list. Assuming the end of the list has not been reached [block 2205], Node Balancer 235 determines whether the thread or MAG at issue has more or less cycles than that which is necessary to move (see processing block 2020 and the associated text) [block 2215]. If the thread or MAG consumes more cycles than what is required, Node Balancer 235 simply continues processing in block 2200. If not, Node Balancer 235 determines whether that which is being considered is a thread or a group [block 2225]. If it is a thread, Node Balancer 235 proceeds to the logic of FIG. 23. If it is a group, the Home node for the group is changed in block 2230 before proceeding to utilize the logic of FIG. 23 for each thread in the group.

Figure 23:
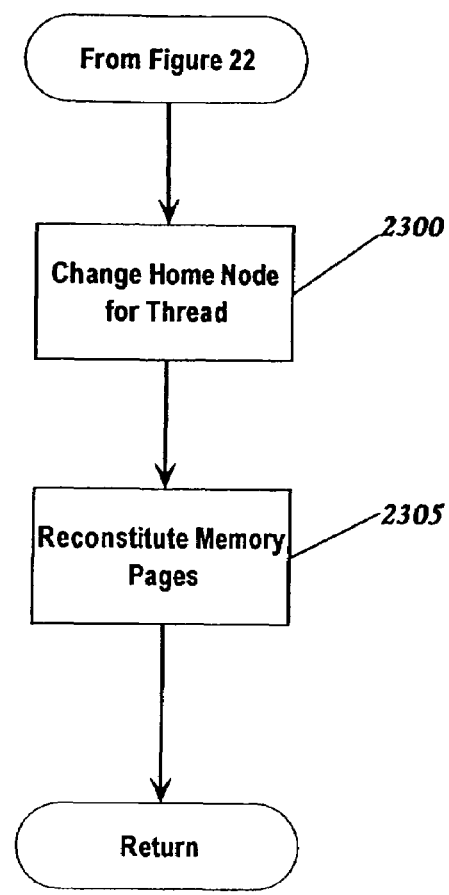

Turning now to FIG. 23, Node Balancer 235 changes the Home Node for the thread at issue [block 2300]. So long as the particular thread retains this particular Home Node, TDM 215 will try and dispatch it to execute on its new Home Node and TMM 217 will try to obtain storage for it on its new Home Node. Finally, in block 2305 Node Balancer 235 will reconstitute the important memory pages associated with the thread. In the preferred embodiment, this is accomplished by rendering pages on the old Home Node temporarily unavailable, copying those pages onto the new Home Node, and making those pages available on the new Home Node. Returning now to FIG. 22, each time a thread or group of threads is moved to a new Home Node, the cycles to move are reduced by the moved cycles [block 2240]. Processing then continues in block 2200 until all of the threads have been considered. When all of the threads have been considered, processing block 2205 evaluates to Yes, causing Node Balancer 235 to re-initialize the OIN. Node Balancer 235 also creates a basis for the next observe interval by extracting the nodal cycle counts and storing them in the oldest save area [block 2210]. These initializations have the effect of causing the next Observe Interval to begin completely anew so that at least six intervals are observed before further balancing is considered.

After performing the initializations, Node Balancer 235 returns to block 2035 of FIG. 20 where it sets the state to Observe Balance before terminating processing in block 2040.

Figure 24:
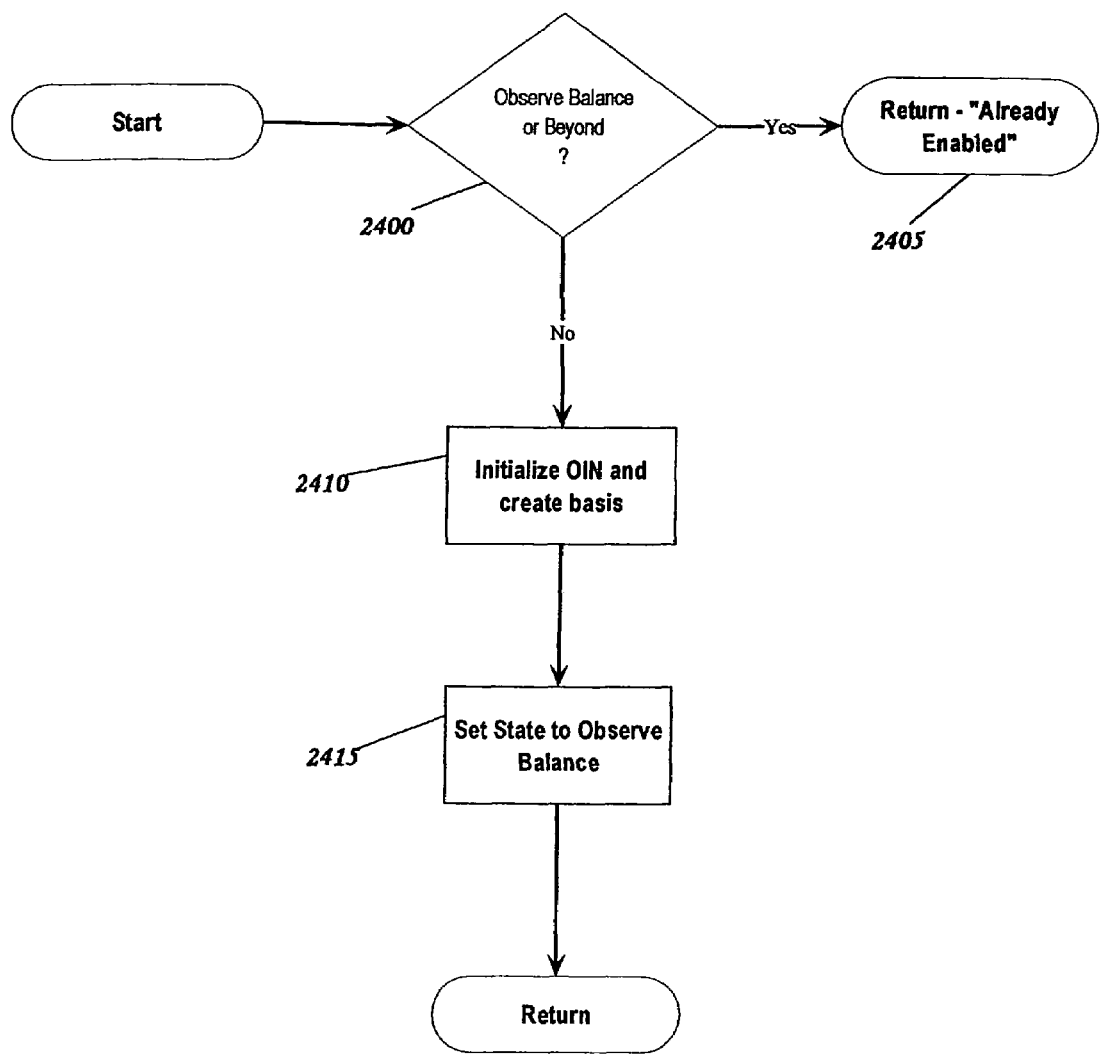
Figure 25:
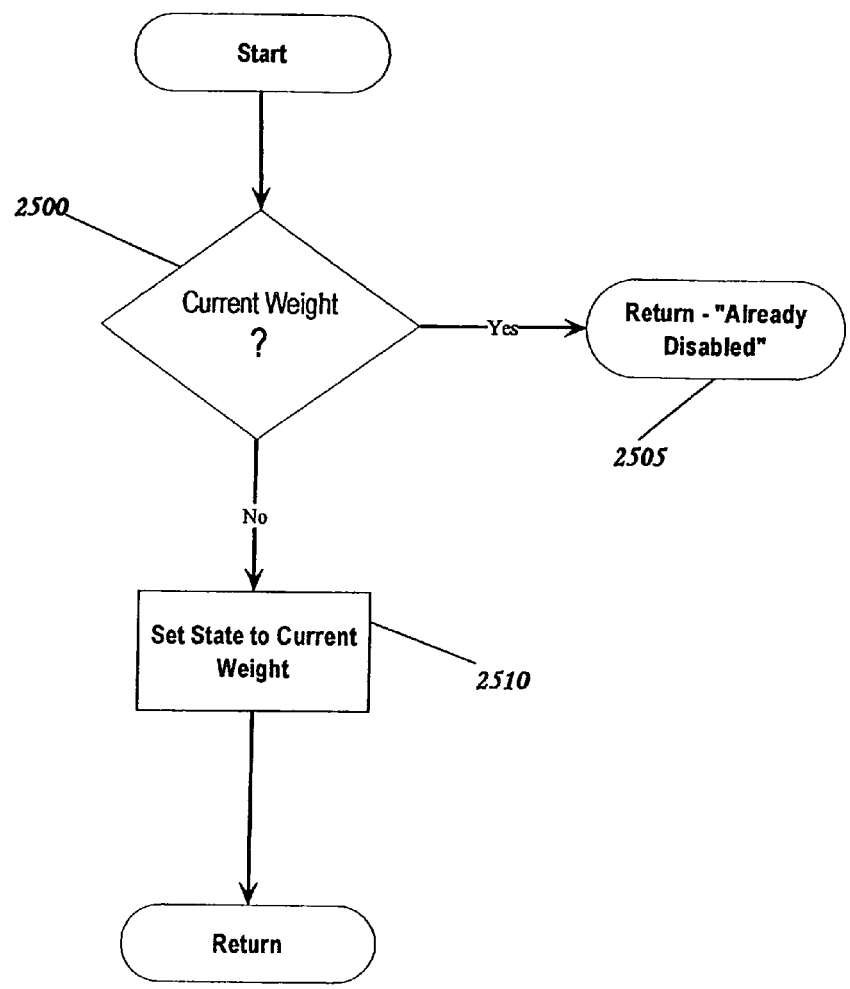

At the outset of the Work Redistribution section of this patent document, we pointed out that the state was initially set to Observe Balance by the system administrator. This is necessary because as the user may recall Node Manager State 2902 is set to Current Weight during IPL (see block 605 of FIG. 6). FIGS. 24 and 25 respectively show the interaction between the system and the system administrator to enable Home Node movement (i.e., rebalancing) and to disable Home Node movement. In the preferred embodiment, the system administrator interacts with computer system 100 through User Interface 150. There the system administrator is able to enter a command that instructs Node Manager 220 to set itself to the Observe Balance state, and thereby enable Home Node movement. In block 2400 of FIG. 24, Node Manager 220 determines whether it is already in the Observe Balance or beyond state. If so, Node Manager 220 simply notifies the system administrator (through User Interface 150) that Home Node movement is already enabled [block 2405]. If Node Manger 220 is not in the Observe Balance state, Node Manager 220 initializes the OIN, as was described in the text associated with block 2210 of FIG. 22. Node Manager 220 then sets its state to Observe Balance in block 2415 before returning.

The system administrator is also able to enter a command that instructs Node Manager 220 to set itself to the Current Weight state, and thereby disable Home Node movement. In block 2500 of FIG. 25, Node Manager 220 determines whether it is already in the Current Weight state. If so, Node Manager 220 simply notifies the system administrator (through User Interface 150) that Home Node movement is already disabled [block 2505]. If Node Manger 220 is not in the Current Weight state, Node Manager 220 then sets its state to Current Weight in block 2510 before returning.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A computer apparatus, said computer apparatus comprising:
   a plurality of nodes, each of said nodes being capable of including at least one processor and at least some memory
   a plurality of threads, each of said threads having one of said nodes assigned thereto; and
   a workload management mechanism ascertaining respective amount of work performed by each node of said plurality of nodes during a recent interval, and adjusting a respective workload assigned to at least one node of said plurality of nodes based on a comparison of a desired workload for each node of said plurality of nodes with said respective work performed by each node of said plurality of nodes during said recent interval.

2. The computer apparatus of claim 1 wherein said desired workload is determined based upon a desired number of processor cycles executed by each node.

3. The computer apparatus of claim 1 wherein said respective amount of work performed is determined based upon an actual number of processor cycles executed by each node.

4. The computer apparatus of claim 1 wherein said respective amount of work performed is determined based upon a determined level of dispatcher activity for each node.

5. The computer apparatus of claim 1 wherein said respective amount of work performed is determined based upon an actual number of processor cycles executed by each node and upon a determined level of dispatcher activity for each node.

6. The computer apparatus of claim 5 wherein said respective amount of work performed is further analyzed to determine a thread-based number of processor cycles and wherein said thread-based number is used to determine how to adjust said respective workload assigned to at least some nodes to arrive at said desired workload.

7. The computer apparatus of claim 6 wherein said respective workload assigned to at least one node is adjusted by assigning a different respective node to at least one of said threads.

8. The computer apparatus of claim 7 wherein threads that are members of a group of threads are not assigned different nodes unless all of the members of the group of threads can be assigned the same node.

9. The computer apparatus of claim 1 wherein said workload management mechanism is capable of being enabled and disabled by a system administrator.

10. A computer-implemented method for execution on a computer apparatus have a plurality of nodes, each node having at least one processor and at least some memory, said computer implemented method comprising the steps of:
    for each of a plurality of threads executing on said computer apparatus, assigning a respective node of said computer apparatus to the thread;
    ascertaining a respective amount of work performed by said each said node of said plurality of nodes during a recent interval; and
    adjusting a respective workload assigned to at least some nodes of said plurality of nodes by changing an assignment previously made by said assigning step to assign a different node to at least one said thread, said adjusting step being based on a comparison of a desired workload for each node of said plurality of nodes with said respective amount of work performed by each node of said plurality of nodes during said recent interval.

11. The computer-implemented method of claim 10 wherein said desired workload is determined based upon a desired number of processor cycles executed by each node.

12. The computer-implemented method of claim 10 wherein said respective amount of work performed is determined based upon an actual number of processor cycles executed by each node.

13. The computer-implemented method of claim 10 wherein said respective amount of work performed is determined based upon a determined level of dispatcher activity for each node.

14. The computer-implemented method of claim 10 wherein said respective amount of work performed is determined based upon an actual number of processor cycles executed by each node and upon a determined level of dispatcher activity for each node.

15. The computer-implemented method of claim 14 wherein said respective amount of work performed is further analyzed to determine a thread-based number of processor cycles and wherein said thread-based number is used to determine how to adjust said respective workload to arrive at said desired workload.

16. The computer-implemented method of claim 10 wherein threads that are members of a group of threads are not assigned different nodes unless all of the members of the group of threads can be assigned the same node.

17. The computer-implemented method of claim 10 further including the step of enabling said ascertaining, and adjusting steps, said enabling step being performed by a system administrator.

18. The computer-implemented method of claim 10 further including the step of disabling said ascertaining, and adjusting steps, said disabling step being performed by a system administrator.

19. The method of claim 10 wherein said step of assigning a respective node to each thread causes at least one thread dispatcher of said computer system to preferentially dispatch threads to the respective node assigned to each thread.

20. A computer implemented program product, said program product comprising:
    a workload management mechanism, said workload management mechanism being configured to perform the steps of,
    determining a desired respective resource utilization of at least one work-performing resource for each node of a plurality of nodes of a computer apparatus, each of said nodes including at least one processor and at least some memory, each of said nodes being capable of being assigned to at least one of a plurality of threads;
    ascertaining respective resource utilization of said at least one work performing resource experienced by said each node of said plurality of nodes; and
    adjusting a respective workload of at least one node of said plurality of nodes based on a comparison of said desired respective resource utilization of at least one work performing resource for each node and said respective resource utilization of said at least one work-performing resource experienced by each node.

21. The program product method of claim 20 wherein said desired respective resource utilization of at least one work-performing resource is determined based upon a desired number of processor cycles executed by each node.

22. The program product of claim 20 wherein said respective respective resource utilization of at least one work-performing resource experienced is determined based upon an actual number of processor cycles executed by each node during an interval.

23. The program product of claim 20 wherein said respective respective resource utilization of at least one work-performing resource experienced is determined based upon a determined level of dispatcher activity for each node during an interval.

24. The program product of claim 20 wherein said respective respective resource utilization of at least one work-performing resource experienced is determined based upon an actual number of processor cycles executed by each node and upon a determined level of dispatcher activity for each node during an interval.

25. The program product of claim 24 wherein said respective respective resource utilization of at least one work-performing resource is further analyzed to determine a thread-based number of processor cycles and wherein said thread-based number is used to determine how to adjust said respective workload to arrive at said desired respective resource utilization.

26. The program product of claim 25 wherein said respective workload is adjusted by assigning different nodes to at least one of said threads.

27. The program product of claim 26 wherein threads that are members of a group of threads are not assigned different nodes unless all of the members of the group of threads can be assigned the same node.

28. The program product of claim 20 wherein said workload management mechanism is capable of being enabled and disabled by a system administrator.

\* \* \* \* \*